United States Patent
Yang et al.

(10) Patent No.: US 12,117,539 B2
(45) Date of Patent: Oct. 15, 2024

(54) INTER-FREQUENCY SIGNAL AIDING FOR TRACKING SATELLITE NAVIGATION SIGNALS

(71) Applicant: The Regents of the University of Colorado, Denver, CO (US)

(72) Inventors: Rong Yang, Boulder, CO (US); Yu Morton, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 339 days.

(21) Appl. No.: 17/632,088

(22) PCT Filed: Aug. 1, 2019

(86) PCT No.: PCT/US2019/044698
§ 371 (c)(1),
(2) Date: Feb. 1, 2022

(87) PCT Pub. No.: WO2021/021212
PCT Pub. Date: Feb. 4, 2021

(65) Prior Publication Data
US 2022/0276393 A1 Sep. 1, 2022

(51) Int. Cl.
*G01S 19/37* (2010.01)
*G01S 19/29* (2010.01)
(Continued)

(52) U.S. Cl.
CPC .............. *G01S 19/37* (2013.01); *G01S 19/29* (2013.01); *G01S 19/30* (2013.01); *G01S 19/32* (2013.01)

(58) Field of Classification Search
CPC .......... G01S 19/37; G01S 19/29; G01S 19/30; G01S 19/32
(Continued)

(56) References Cited

U.S. PATENT DOCUMENTS

| 7,230,999 B1 | 6/2007 | Deines et al. |
| 2013/0021934 A1 | 1/2013 | Rugamer et al. |

(Continued)

FOREIGN PATENT DOCUMENTS

| CN | 104181558 A | * 12/2014 | ............ G01S 19/24 |
| CN | 104331733 A | * 2/2015 | |

(Continued)

OTHER PUBLICATIONS

International Application No. PCT/US2019/044698, International Search Report & Written Opinion, 13 pages, Dec. 5, 2019.

*Primary Examiner* — Harry K Liu
(74) *Attorney, Agent, or Firm* — Kasha Law LLC; John R. Kasha; Kelly L. Kasha

(57) ABSTRACT

Various embodiments of the present technology generally relate to multi-frequency satellite navigation receiver technology. More specifically, some embodiments relate to an inter-frequency signal aiding technique for multi-frequency signal tracking in a multi-frequency receiver. The present technology enables a satellite navigation receiver (such as GPS) to continue operation, or to have improved performance, in environments where signals on one or more frequency bands experience fading. Some embodiments can estimate parameters of signal channels that experience fading based on measurements obtained from all or other less compromised frequency bands in linear operation by the receiver. Some embodiments can optimally estimate carrier parameters of navigation signals with consideration of relative measurement qualities. These parameters are used to construct the local reference signals, maintain lock on the fading signals, and obtain accurate positioning solutions and remote sensing observations.

13 Claims, 11 Drawing Sheets

(51) Int. Cl.
    *G01S 19/30*  (2010.01)
    *G01S 19/32*  (2010.01)
(58) Field of Classification Search
    USPC .................................................... 342/357.68
    See application file for complete search history.

(56) References Cited

U.S. PATENT DOCUMENTS

| | | |
|---|---|---|
| 2015/0160350 A1 | 6/2015 | Waters et al. |
| 2017/0201714 A1* | 7/2017 | Kim ........................ H04N 5/911 |
| 2017/0279520 A1 | 9/2017 | Kitazawa et al. |
| 2019/0308513 A1* | 10/2019 | Akhavan-Tafti ........ B60L 53/37 |

FOREIGN PATENT DOCUMENTS

| | | | | | |
|---|---|---|---|---|---|
| CN | 108761506 A | * | 11/2018 | | |
| CN | 109581386 A | * | 4/2019 | ............. | G01F 23/24 |
| CN | 109581440 A | * | 4/2019 | | |
| WO | WO-2006003673 A1 | * | 1/2006 | ............. | G01S 19/30 |

\* cited by examiner

INTER-FREQUENCY SIGNAL AIDING FOR TRACKING SATELLITE NAVIGATION SIGNALS

STATEMENT REGARDING FEDERALLY SPONSORED RESEARCH

This invention was made with government support under grant numbers 80NSSC18K0503 awarded by NASA and FA8650-14-D-1735 awarded by the U.S. Air Force. The government has certain rights in the invention.

CROSS-REFERENCE TO RELATED APPLICATIONS

This application is a national stage of International Patent Application No. PCT/US2019/044698 filed Aug. 1, 2019, which is incorporated by reference herein in its entirety.

TECHNICAL FIELD

Various embodiments of the present technology generally relate to multi-frequency satellite navigation receiver technology. More specifically, some embodiments relate to an inter-frequency signal aiding technique with linear or optimal integration for multi-frequency signal carrier tracking in a multi-frequency satellite receiver for navigation or remote sensing applications on different types of dynamic platforms.

BACKGROUND

Global Navigation Satellite System (GNSS), which includes Global Positioning System (GPS), Galileo, GLONASS, Beidou, and other regional systems, provides precise time synchronization and accurate geospatial positioning. GNSS systems typically include multiple satellites that broadcast multi-frequency signals. The signals are picked up by receivers (e.g., in airplanes, automobiles, sea vessels, cell phones, surveying equipment, etc.) that extract desired information from the signals. Occasionally, GNSS receivers encounter degraded signals which cause inaccuracies in the acquired data. In some cases, signal degradation is the result of ionospheric or tropospheric scintillations, while in other instances, multipath interferences result in inaccurate reporting. However, any type of signal degradation or interference can be a significant concern and have resounding impacts on time synchronization as well as the accuracy of geospatial positioning reporting.

Sometimes signal interference occurs as a result of operating the GNSS receivers in challenging areas (e.g., urban areas, which cause multipath interferences; signal transmission across extended distances through the atmosphere, which increases the likelihood of scintillation). Unfortunately, conventional receivers are not able to adequately track the degraded signals through these challenging environments and provide trustworthy positioning solutions.

SUMMARY

Various embodiments of the present technology relate to systems, methods, and techniques for an inter-frequency signal aiding technique for multi-frequency signal tracking in a multi-frequency GNSS receiver for navigations and remote sensing applications on different types of dynamic platforms. In some embodiments, the systems, methods, and techniques can implement an inter-frequency aiding procedure with linear combination of multi-frequency measurements. In some embodiments, the multi-frequency signals are optimally integrated for inter-frequency aiding implementation to improve carrier tracking robustness and accuracy. In some embodiments, a multi-frequency signal receiver system can include an antenna configured to receive multi-frequency signals. The receiver system can also contain a front-end portion that is adapted to down convert the received signals and a baseband processing portion that is configured to obtain signal parameters and to aid in tracking degraded signals. A navigation processor can be similarly located in the receiver system of some embodiments and may be relied upon to determine receiver position, velocity, and time (PVT).

In some embodiments, a multi-frequency navigation receiver system can implement a tracking architecture for a code tracking loop in which one or more correlators correlate local code signals with the received code signals and one or more discriminators obtain code state estimation errors. The tracking architecture can also use one or more loop filters to obtain a filter gain matrix for each frequency of the received signals. One or more state estimators can be implemented to obtain code state estimations for each frequency in the single frequency tracking (ST) mode, and a fundamental state estimator obtains the fundamental code state estimation for the inter-frequency aiding of multi-frequency signals in the joint tracking (JT) or optimal tracking (OT) mode. The tracking architecture can use one or more scale blocks to scale the fundamental code state estimation to each code state using a frequency ratio, and either the state estimations from the ST mode or the multi-frequency tracking mode (JT or OT) are used as inputs to generate updated local code signals.

In some embodiments, a multi-frequency navigation receiver system can use a tracking architecture for a carrier tracking loop in which one or more correlators correlate local carrier signals with the received carrier signals and one or more discriminators obtain carrier state estimation errors. The tracking architecture can use one or more loop filters to obtain a filter gain matrix for each frequency of the received signals. One or more state estimators can be used to obtain carrier state estimations for each frequency in the ST mode, and a fundamental state estimator can be used to obtain the fundamental carrier state estimation for the inter-frequency aiding of multi-frequency signals in the JT or OT mode. The tracking architecture can then use one or more scale blocks to scale the fundamental carrier state estimation to each carrier state using a frequency ratio, and either the state estimations from the ST mode or the multi-frequency tracking mode (JT or OT) are used as inputs to generate updated local carrier signals.

A multi-frequency navigation receiver system can be used in some embodiments to implement a switching strategy to switch between using signal inputs derived from either a single frequency tracking (ST) mode and a multi-frequency tracking mode (JT or OT) mode according to a switch indicator.

In some embodiments, a multi-frequency GNSS receiver system uses an antenna configured to receive multi-frequency GNSS signals. The receiver system can also contain a front-end portion that is adapted to down convert the received signals and a baseband processing portion that is configured to obtain accurate signal parameters for aiding the degraded signals tracking and to obtain effective measurements for navigation and/or remote sensing processors. The navigation processor located in the receiver system of some embodiments is used for receiver PVT determination.

The remote sensing processor can be similarly located in the receiver system of some embodiments and may be relied upon for sounding parameter retrieval and characterization.

Embodiments of the present technology also include computer-readable storage media containing sets of instructions to cause one or more processors to perform the methods, variations of the methods, and other operations described herein.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
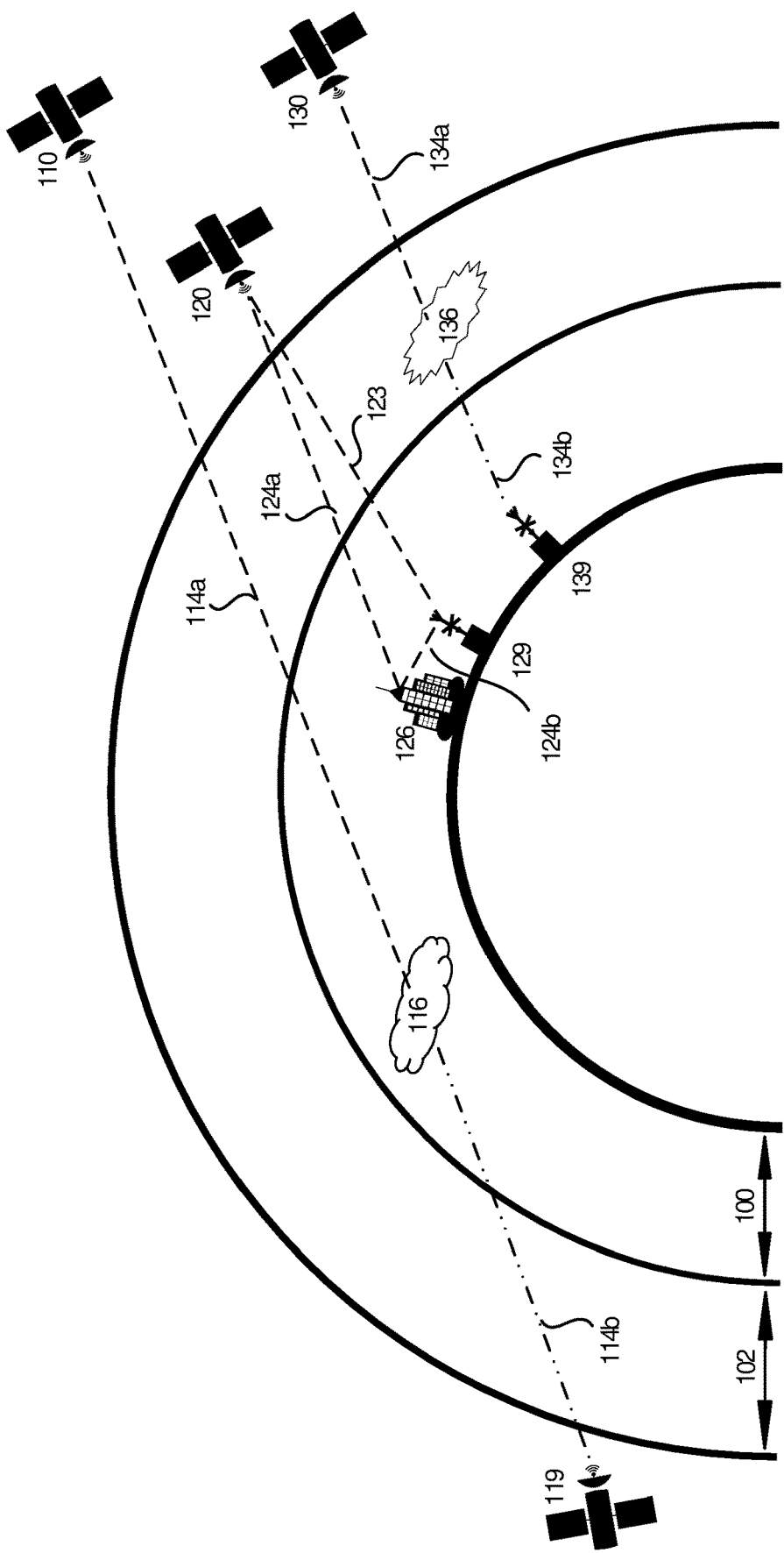
FIG. 1 illustrates an example of an environment in which some embodiments of the present technology may be utilized.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to multi-frequency satellite navigation receiver technology. More specifically, some embodiments relate to an inter-frequency signal aiding technique for multi-frequency signal tracking in a multi-frequency satellite navigation receiver. For a variety of reasons, GNSS receivers can encounter degraded signals which result in inaccuracies in the acquired data. For example, in some cases, signal degradation is the result of ionospheric or tropospheric scintillations, while in other instances, multipath interferences result in inaccurate reporting. However, any type of signal degradation or interference can be a significant concern and have resounding impacts on time synchronization as well as the accuracy of geospatial positioning reporting.

In some conventional receivers, signals from each of the visible satellites are independently tracked. In other words, each channel of the receiver tracks its respective signal independent of the other channels. This process is linear with no information being fed back through the receiver's signal tracking system. Known methods for improving degraded signal tracking for this variety of receiver consist of either increasing integration time or decreasing filter bandwidth. Although these solutions may be sufficient in some circumstances, they lack the flexibility and adaptability that is best for tracking signals with fast changes in high dynamic applications. Also, increasing the integration time consumes more power and requires more storage space.

More advanced receivers take a different approach that is based on inter-channel aiding techniques to improve signal tracking accuracy and robustness. For example, a conventional vector tracking process utilizes measurements from multiple satellite signals to aid in tracking a degraded satellite signal and provide a more reliable computation of a receiver's position, velocity, and time (PVT). This process exploits spatial diversity and requires prior knowledge of the receiver PVT solutions. As all channels linked together through vector tracking architecture, a healthy signal channel may be corrupted by a fading signal channel, causing tracking performance degradation and inaccuracies in the PVT reporting.

Some techniques utilize the frequency diversity to enhance degraded signal tracking based on the measurements of signals that are broadcasted by the same satellite. The aggregate predictive filter techniques, such as the Kalman filter and the sigma rho filter, have been applied to jointly estimate the signal parameters, i.e., code delay, carrier phase and Doppler frequency, based on the multi-frequency measurements as well as frequency dependency features. However, in realistic environments, some atmospheric or environmental effects will cause phase divergence among different carriers. As all the phase estimations are combined in the aggregate predictive filter, the phase tracking will become biased over time, which will reduce the message decoding performance on all frequencies and limit the applicability of the resulting phase measurements for carrier-phase based positioning applications.

To address this issue, various embodiments of the present technology take a more flexible approach to realizing the benefits of the inter-frequency aiding technique. These embodiments allow a conventional single-frequency tracking (ST) mode as well as a multi-frequency tracking (MT) mode for each signal tracking channel. In ST mode, each channel tracks a single signal independently, whereas MT mode utilizes inter-frequency aiding technique to estimate the common parameters among the multi-frequency signals and scales them with their respective frequency dependency ratios in each signal channel. Two optional implementations, i.e., joint tracking (JT) and optimal tracking (OT), can be utilized in the MT mode based on the linear and optimal combination of multi-frequency signals. The operations of ST and MT (JT or OT) modes in each signal channel can be adaptively alternated based on switch indicators, such as the parameters of signal strength estimations that can reflect the actual signal quality changes. This switching strategy, therefore, can maximize the benefits of the ST, JT, and OT and guarantees the tracking performance in each signal channel. With the inter-frequency aiding and switching behaviors, it is possible for the multi-frequency receiver to use relatively short integration times to maintain lock on the high dynamic signals that experience deep fading or phase fluctuations in challenging environments.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a GNSS environment to accurately show implementation of the technology in a GNSS receiver, other embodiments of the present technology are equally applicable to various other applications.

Additionally, some embodiments of the present technology provide significant advantages of scalability and flexibility for accommodating various signals from the multiple navigation satellite systems. The scope of the present technology is intended to cover all such embodiments that may fall within the scope of the appended claims, either literally or under the doctrine of equivalents. For example, the technology disclosed herein can be applied to not only the code and carrier tracking loops but also frequency tracking loops. In addition, the present technology is not to be limited to systems with triple frequency, as the technology can be adapted for dual-frequency systems or systems with more than three frequency signals.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

General Environment

FIG. 1 illustrates an example of an environment in which some embodiments of the present technology may be utilized. The environment through which a signal is broadcast may have a significant impact on signal integrity. For example, urban environments contain tall structures with reflective surfaces, which can bounce signals and cause degradation. Forests and deep valleys may similarly reflect signals and cause degradation. This type of degradation is referred to as signal multipathing or multipath interference. Weather may also cause interferences. For example, clouds and precipitation may have subtle effects on signal reliability while electromagnetic weather conditions in the earth's ionosphere and troposphere also impact the trustworthiness of a signal. The interference of electromagnetic conditions that cause fluctuations in the amplitude or phase of signal is referred to as scintillation.

Signal transmitters 110, 120, and 130 represent satellite signal transmitters. Receiver 119 represents satellite-based receiver platforms and receivers 129 and 139 represent ground-based receivers. Signal transmitter 110 transmits multi-frequency signal 114a. Multi-frequency signal 114a travels through weather event 116 located in troposphere 100 and becomes degraded signal 114b. Degraded signal 114b may comprise degraded code and carrier signals with amplitude, phase or both amplitude and phase scintillations. Receiver 119 receives degraded signal 114b.

Signal transmitter 120 transmits multi-frequency signal 123 and multi-frequency signal 124a. Multi-frequency signal 123 does not experience degradation and is received by receiver 129 in a healthy state. Multi-frequency signal 124a travels through urban environment 126 with multipath interferences and becomes degraded signal 124b. Degraded signal 124b may comprise degraded code and carrier signals with amplitude, phase, or both amplitude and phase scintillations. Degraded signal 124b may also comprise echoes as a result of multipathing. Receiver 129 then receives degraded signal 124b.

Signal transmitter 130 transmits multi-frequency signal 134a. Multi-frequency signal 134a travels through weather event 136 located in ionosphere 102 and becomes degraded signal 134b. Degraded signal 134b may comprise degraded code and carrier signals with amplitude, phase, or both amplitude and phase scintillations. Receiver 139 receives degraded signal 134b.

Signal transmitters 110, 120, and 130 are designed to broadcast multiple signals at different frequencies. For example, current operational GPS satellites broadcast three civil signals simultaneously, i.e., L1C/A, L2C, and L5, at 1575.42 MHz, 1227.6 MHz, and 1176.45 MHz bands, respectively. L1C/A is a legacy signal with 50 Hz navigation message modulation and is broadcasted by each of the satellites. The C/A pseudo-random noise (PRN) ranging codes are Gold codes with a period of 1023 chips, transmitted at 1.023 MHz (1 ms repetition period). L2C is only transmitted by the Block IIR-M and later satellites. L2C contains two distinct PRN code sequences to provide ranging information at 1227.6 MHz: the civil-moderate code (CM) and the civil-long length code (CL).

The CM code is 10,230 bits long and modulated with the navigation message, repeating every 20 ms. The CL code is 767,250 bits long without data modulation, repeating every 1500 ms. Each PRN sequence is transmitted at 511.5 kHz rate; however, they are time-multiplexed to form a 1.023 MHz signal. L5 is only available on the Block IIF and later satellites. L5 transmits two PRN ranging codes on two carrier components at 1176.45 MHz: the in-phase code (L5I) and the quadrature phase code (L5Q). Both codes are 10,230 bits long and transmitted at 10.23 MHz. L5I is modulated with navigation data and a 10-bit Neuman-Hoffman (NH) code with a 1 kHz code rate. L5Q is a dataless sequence with a 20-bit NH code at 1 kHz rate. Degradation of the civil signals is of significant concern because degraded signals cause inaccuracies in the data reported by the receivers.

Multi-Frequency Receiver Architecture

Figure 2:
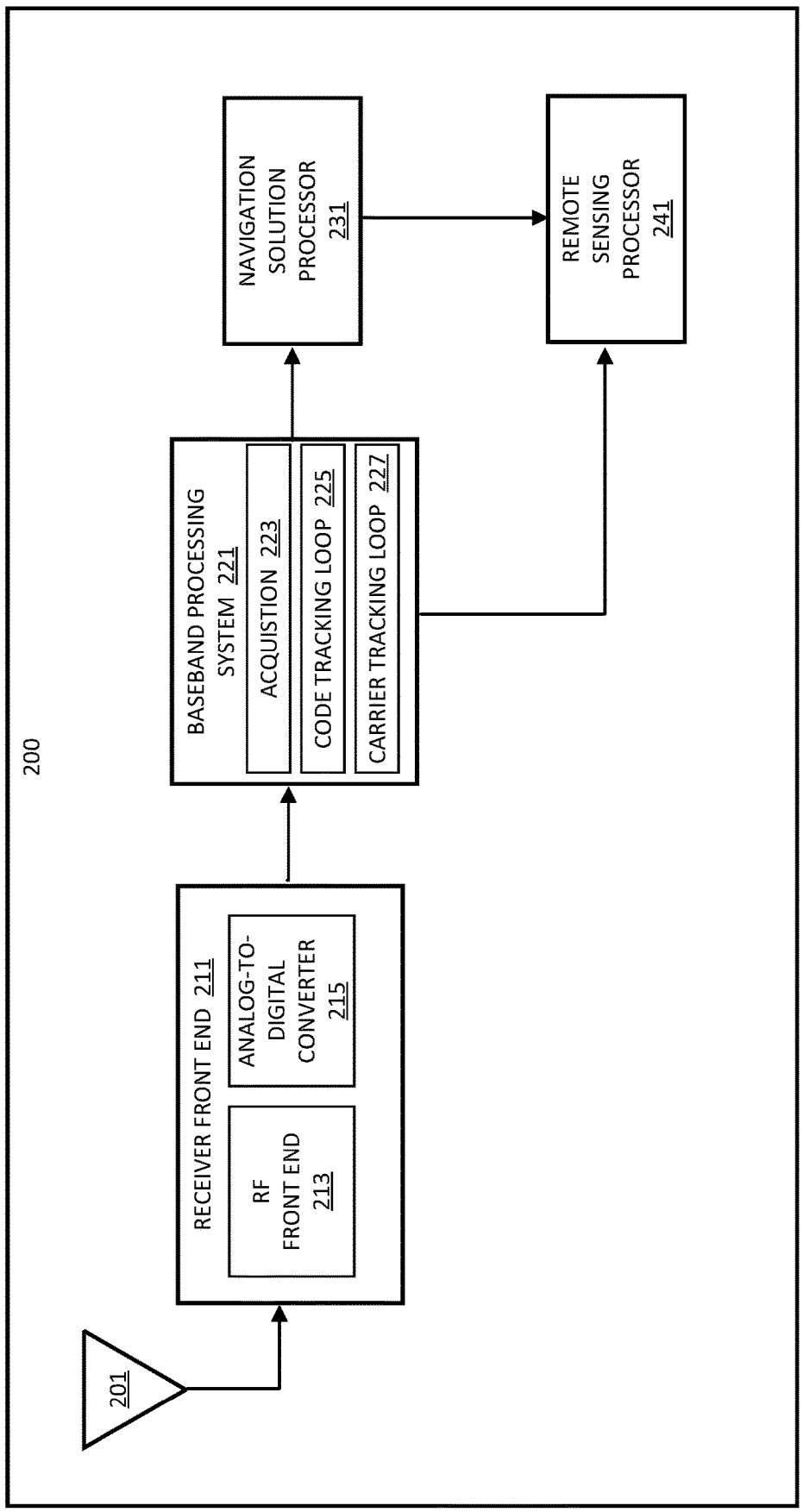
FIG. 2 illustrates a block diagram of a multi-frequency signal receiver in accordance with some embodiments of the present technology.

FIG. 2 illustrates a block diagram of a multi-frequency signal receiver 200 in accordance with some embodiments of the present technology. Multi-frequency signal receiver 200 represents a satellite navigation receiver capable of receiving signals transmitted by satellites that include one or more carrier signals, e.g., L1C/A, L2C, and L5 signals. Such multi-frequency navigation systems can be utilized in a wide range of applications, such as precise positioning, navigation, and remote sensing.

As illustrated in the embodiments shown in FIG. 2, multi-frequency receiver 200 can include an antenna system 201, a receiver front end 211, a baseband processing system 221, a navigation processor 231 and a remote sensing processor 241. FIG. 2 only presents the core components as an embodiment in which the present technology can be utilized. Commercial navigation receivers may also incorporate extension components, such as keyboards, displays, external interface modules, etc.

Antenna system 201 represents a multi-frequency antenna that is designed with wide bandwidth to support multi-frequency signals. Antenna system 201 may also represent an array of antennas adapted to each specific signal frequencies, such as, GPS L1C/A, L2C, and L5, etc. Multi-frequency signals from multiple satellites are intercepted by antenna system 201 and provided as an input of receiver front end 211.

Receiver front end 211 includes radio frequency (RF) front-end 213. RF front-end 213 can be configured to perform signal conditioning and down conversions, where the signal spectrum is moved from RF to an intermediate frequency (IF) or a baseband frequency. RF front-end 213 may include one or more signal down converters (not shown) that can be configured to multiple frequency signals driven by a common local oscillator (not shown). The analog multi-frequency outputs from RF front-end 213 can be digitized and quantized in analog-to-digital converter (ADC) 215. In each time interval, the digital signals at each frequency may include one or more digital samples that are available at a sampling rate and a finite quantization level.

Output from ADC 215, i.e., the multi-frequency digital signals, are input to baseband processing system 221, and, in particular, to acquisition module 223 for capturing the visible satellites. The coarse estimations of the PRN code delay $\tau$ and the carrier Doppler frequency $f_d$ from each visible satellite at each frequency are obtained in acquisition module 223. The acquisition results are used to initialize the tracking loops, i.e., code tracking loop 225 and carrier tracking loop 227. Code tracking loop 225 continuously provides accurate code state estimations, i.e., the code delay $\hat{\tau}$ in chip or sample unit, code Doppler frequency $\dot{\hat{\tau}}$ in Hz, and code Doppler rate $\ddot{\hat{\tau}}$ in Hz/s (for high dynamic application).

Simultaneously, carrier tracking loop 227 can track the carrier signals with the estimations of the carrier phase $\hat{\varphi}$ in radians, Doppler frequency $\hat{f}_d$ in Hz, and Doppler frequency rate $\dot{\hat{f}}_d$ in Hz/s (for high dynamic application). Based on these estimations, the code sequences and carrier sequences (in alignment with the received signals) can be generated and wiped off in a correlator in each update interval. The update interval typically refers to the integration time interval, T, wherein T is typically 1 ms for GPS normal signals.

The resulting correlation sequences in baseband processing system 221 contain only the navigation messages. Navigation solution processor 231 can decode the navigation messages to obtain the satellite orbits, transmitting time, error correction parameters, etc. Together with the code and carrier state estimations in code tracking loop 225 and carrier tracking loop 227, respectively, the navigation solution processor 231 can calculate and output the receiver positioning results. For some remote sensing applications, the remote sensing processor 241 can take the signal estimates from baseband processing system 221 and the positioning solution from navigation solution processor 231 to retrieve atmospheric refractivity or surface reflectivity.

General Tracking Architecture

Figure 3:
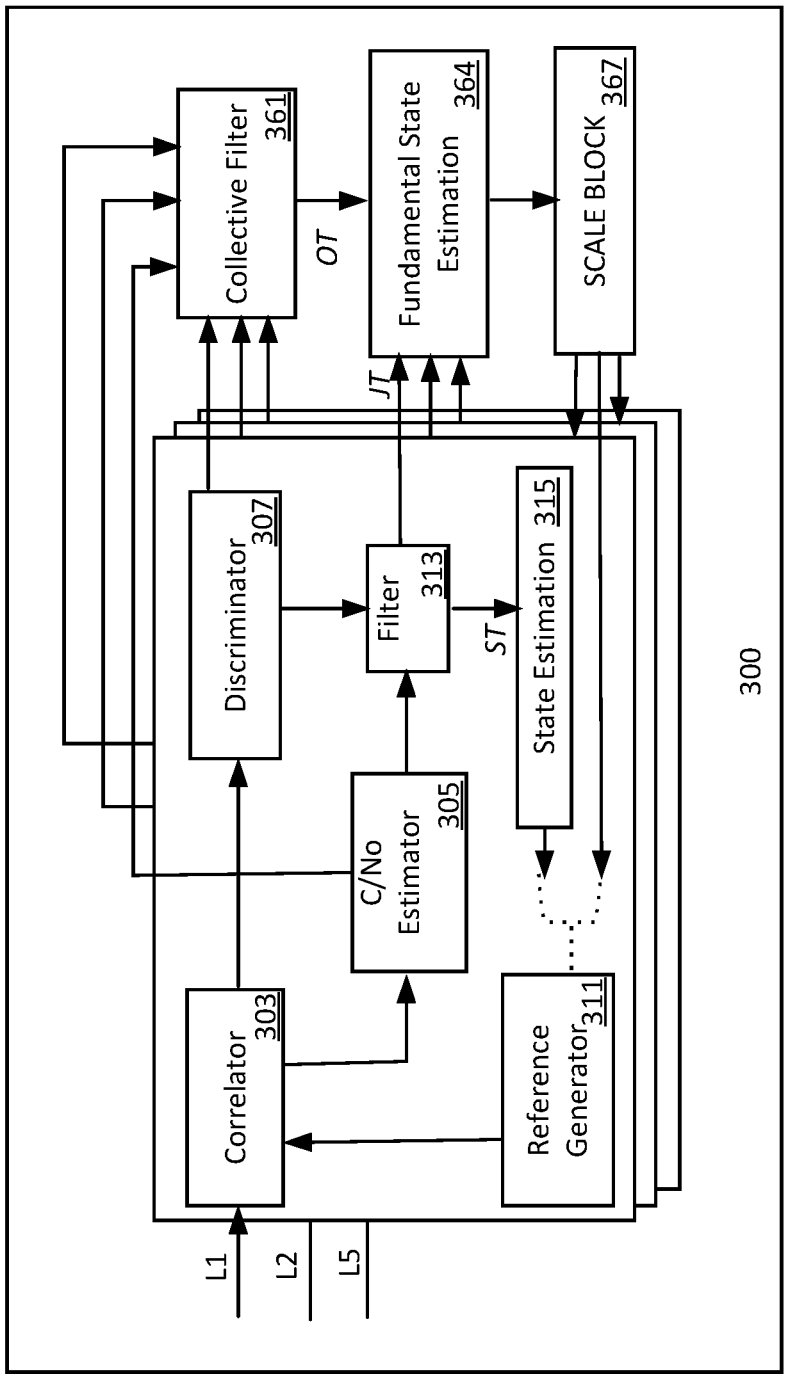
FIG. 3 illustrates a block diagram of a general multi-frequency tracking architecture with joint tracking (JT) and optimized tracking (OT) illustrated along with the single-carrier tracking (ST) in accordance with some embodiments of the present technology.

FIG. 3 illustrates a block diagram of a general multi-frequency tracking architecture with joint tracking (JT) and optimized tracking (OT) illustrated along with the single-carrier tracking (ST) in accordance with some embodiments of the present technology. As illustrated in FIG. 3, tracking architecture 300 can include correlator 303, C/No estimator 305, discriminator 307, state estimation module 315, reference generator 311, individual filter 313, collective filter 361, fundamental state estimation module 364, and scale block 367. Correlator 303 correlates the input L1, L2, or L5 signals with each local replica (generated by reference generator 311) to obtain correlation results in each tracking channel, respectively. The C/No estimator 305 and discriminator 307 utilizes the correlation results to estimate the signal strength and tracking error measurements, respectively.

The filter 313 is controlled by the signal strength estimations from C/No estimator 305 to adjust the filter parameters to eliminate the noise in the tracking error measurements. Then the ST mode obtains the state estimation 315 based on the filter 313 output. While the JT mode utilizes the inter-carrier aiding strategy to obtain the fundamental state estimation 364 based on the linear combinations of each channel's filter 313 output. Then the JT state estimations are calculated by scaling the fundamental state estimation 364 with each respective frequency ratio via scale block 367. The OT mode takes a different way to realize inter-carrier aiding. In the OT implementation, the different measurements are optimally combined in a collective filter 361 with filter gain controlled by each channel's C/No estimator to obtain the fundamental state estimation 364.

Then the fundamental state estimation 364 is scaled with each respective frequency ratio via scale block 367 to obtain the OT state estimation for each frequency signal. Some embodiments allow the receivers to actively select among three basic modes to drive reference generator 311: 1) ST without using inter-carrier aiding, 2) JT, and 3) OT. Some embodiments can use a state space-based approach to the inter-frequency aiding and the performance assessment for multi-frequency code and carrier tracking.

ST Mode

Figure 4:
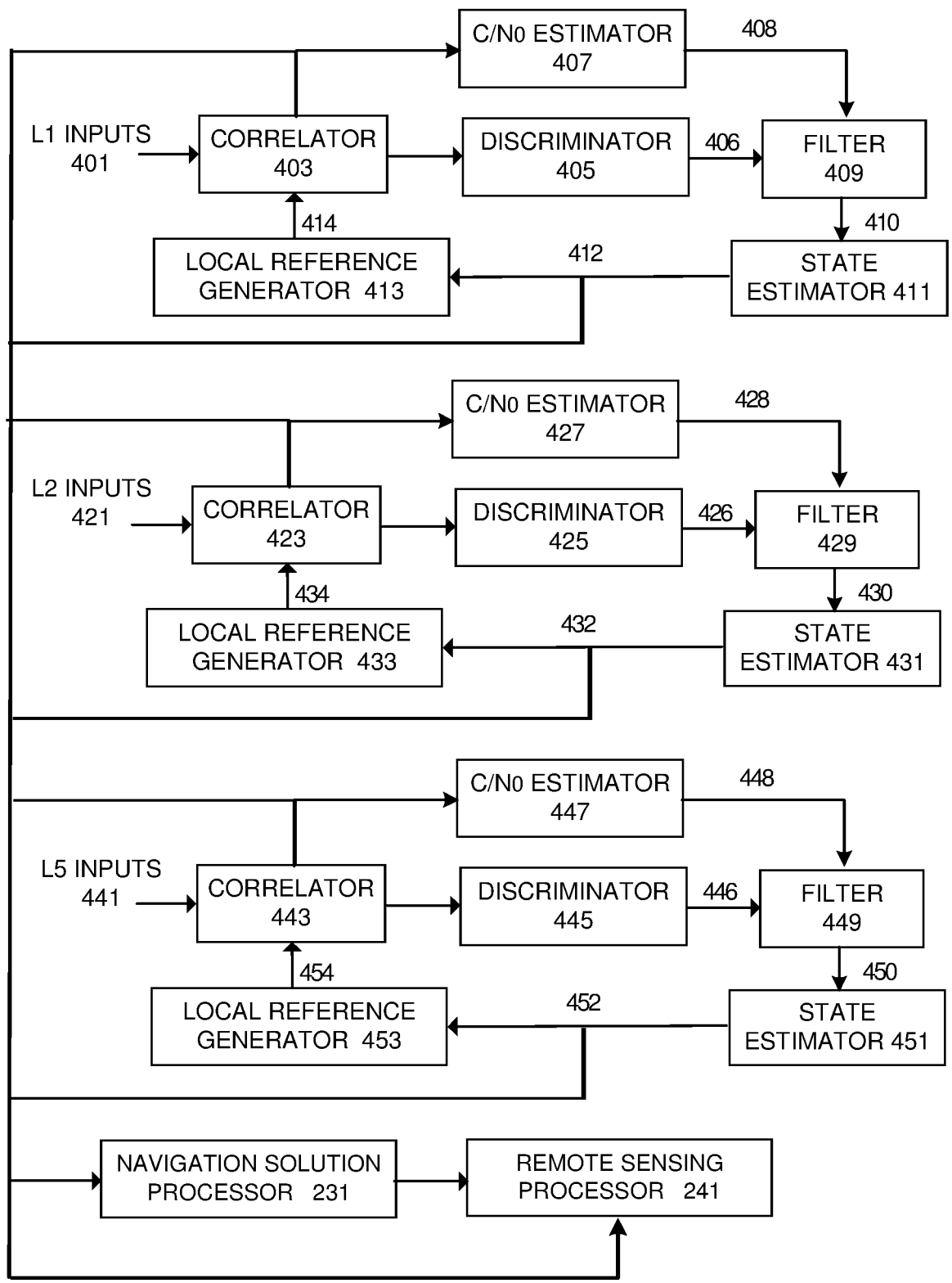
FIG. 4 illustrates a block diagram of an ST mode in accordance with some embodiments of the present technology.

FIG. 4 illustrates a block diagram of a ST mode in accordance with some embodiments of the present technology. L1 inputs 401, L2 inputs 421, and L5 inputs 441 represent intercepted civil signal channels L1, L2, and L5, respectively. However, embodiments of present technology are not limited to specific navigation systems and its application in various systems, including those with multiple signals at different bands, is anticipated.

In the L1 inputs 401 signal channel, correlator 403 correlates L1 inputs 401 (e.g., which were collected from the receiver front end 211) with the local code sequences and carrier sequences, which are represented by signal 414, via the integration accumulation operations. The local reference generator 413 for code tracking loop 225 and carrier tracking loop 227 can include a separate code signal generator and a carrier signal generator. In some embodiments, the code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 403 outputs six correlation results, EI, EQ, PI, PQ, LI, and LQ. These results may be used in navigation solution processor 231 (e.g., PI) for navigation message decoding if the signal is modulated with navigation data, in signal $C/N_0$ estimator 407 (e.g., PI and PQ) to obtain L1 signal strength estimations 408, or in code and phase discriminators located in discriminator 405 to obtain interval average estimation error 406 between L1 inputs 401 and signal 414. For instance, in code tracking loop 225 the code discriminator aspect of discriminator 405 utilizes EI, EQ, LI, and LQ to obtain the average code delay error measurements, and in carrier tracking loop 227 the phase discriminator aspect of discriminator 405 utilizes PI and PQ to calculate the average phase error measurements.

Filter 409 can be used to calculate the filter gain in order to eliminate the noise effects in discriminator output estimation error 406. The second order and third order low pass filters are typically used for the static and dynamic applications. Filter 409 can be implemented in various designs, such as, the proportional integral filter (PIF), the Wiener filter (WF), and the Kalman filter (KF). Taking the KF design for example, filter gains are controlled by the signal qualities, such as signal $C/N_0$ estimations 408 from signal $C/N_0$ estimator 407 output.

Filter output 410 can then be used to update state estimation 412 in the state estimator 410. State estimation 412 relies on L1 inputs 401 and estimation error 406, which means state estimation 412 is independent of the other signal channels. If state estimation 412 is fed back to local reference generator 413, the tracking loop is regarded as operating in ST mode.

In the L2 inputs 421 signal channel, correlator 423 correlates L2 inputs 421 (i.e., which were collected from the receiver front end 211) with the local code sequences and carrier sequences, which are represented by signal 434, via the integration accumulation operations. The local reference generator 433 for code tracking loop 225 and carrier tracking loop 227 can include a separate code signal generator and a carrier signal generator. The code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 423 outputs six correlation results, EI, EQ, PI, PQ, LI, and LQ. These results may be used in navigation solution processor 231 (e.g., PI) for navigation message decoding if the signal is modulated with navigation data, or signal $C/N_0$ estimator 427 (e.g., PI and PQ) to obtain L2 signal strength estimations 428, or in code and phase discriminators located in discriminator 425 to obtain interval average estimation error 426 between L2 inputs 421 and signal 434. For instance, in code tracking loop 225 the code discriminator aspect of discriminator 425 utilizes EI, EQ, LI, and LQ to obtain the average code delay error measurements, and in carrier tracking loop 227 the phase discriminator aspect of discriminator 425 utilizes PI and PQ to calculate the average phase error measurements.

Filter 429 can be used to calculate the filter gain in order to eliminate the noise effects in discriminator output estimation error 426. The second order and third order low pass filters are typically used for the static and dynamic applications. Filter 429 can be implemented in various designs, such as, the proportional integral filter, the Wiener filter, and the Kalman filter. Taking the KF design for example, filter gains are controlled by the signal qualities, such as signal $C/N_0$ estimations 428 from signal $C/N_0$ estimator 427 output.

Filter output 430 is then used to update state estimation 432 in the state estimator 431. State estimation 432 relies on L2 inputs 421 and estimation error 426, which means state estimation 432 is independent of the other signal channels. If state estimation 432 is fed back to local reference generator 433, the tracking loop is regarded as operating at ST mode.

In the L5 inputs 441 signal channel, correlator 443 correlates L5 inputs 441 (i.e., which were collected from the receiver front end 211 in FIG. 2) with the local code sequences and carrier sequences, which are represented by signal 454, via the integration accumulation operations. The local reference generator 453 for code tracking loop 225 and carrier tracking loop 227 can include a separate code signal generator and a carrier signal generator. The code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 443 outputs six correlation results, EI, EQ, PI, PQ, LI, and LQ. These results may be used in navigation solution processor 231 (e.g., PI) for navigation message decoding if the signal is modulated with navigation data, or in signal $C/N_0$ estimator 447 (e.g., PI and PQ) to obtain L5 signal strength estimations 448, or in code and phase discriminators located in discriminator 445 to obtain interval average estimation error 446 between L5 inputs 441 and signal 454. For instance, in code tracking loop 225 the code discriminator aspect of discriminator 445 utilizes EI, EQ, LI, and LQ to obtain the average code delay error measurements, and in carrier tracking loop 227 the phase discriminator aspect of discriminator 445 utilizes PI and PQ to calculate the average phase error measurements.

Filter 449 can be used to calculate the filter gain in order to eliminate the noise effects in discriminator output estimation error 446. The second order and third order low pass filters are typically used for the static and dynamic applications. Filter 449 can be implemented in various designs, such as, the proportional integral filter, the Wiener filter, and the Kalman filter. Taking the KF design for example, filter gains are controlled by the signal qualities, such as signal $C/N_0$ estimations 448 from signal $C/N_0$ estimator 447 output.

Filter output 450 is then used to update state estimation 452 in the state estimator 451. State estimation 452 relies on L5 inputs 441 and estimation error 446, which means state estimation 452 is independent of the other signal channels. If state estimation 452 is fed back to local reference generator 453, the tracking loop is regarded as operating in ST mode.

JT Mode

Figure 5:
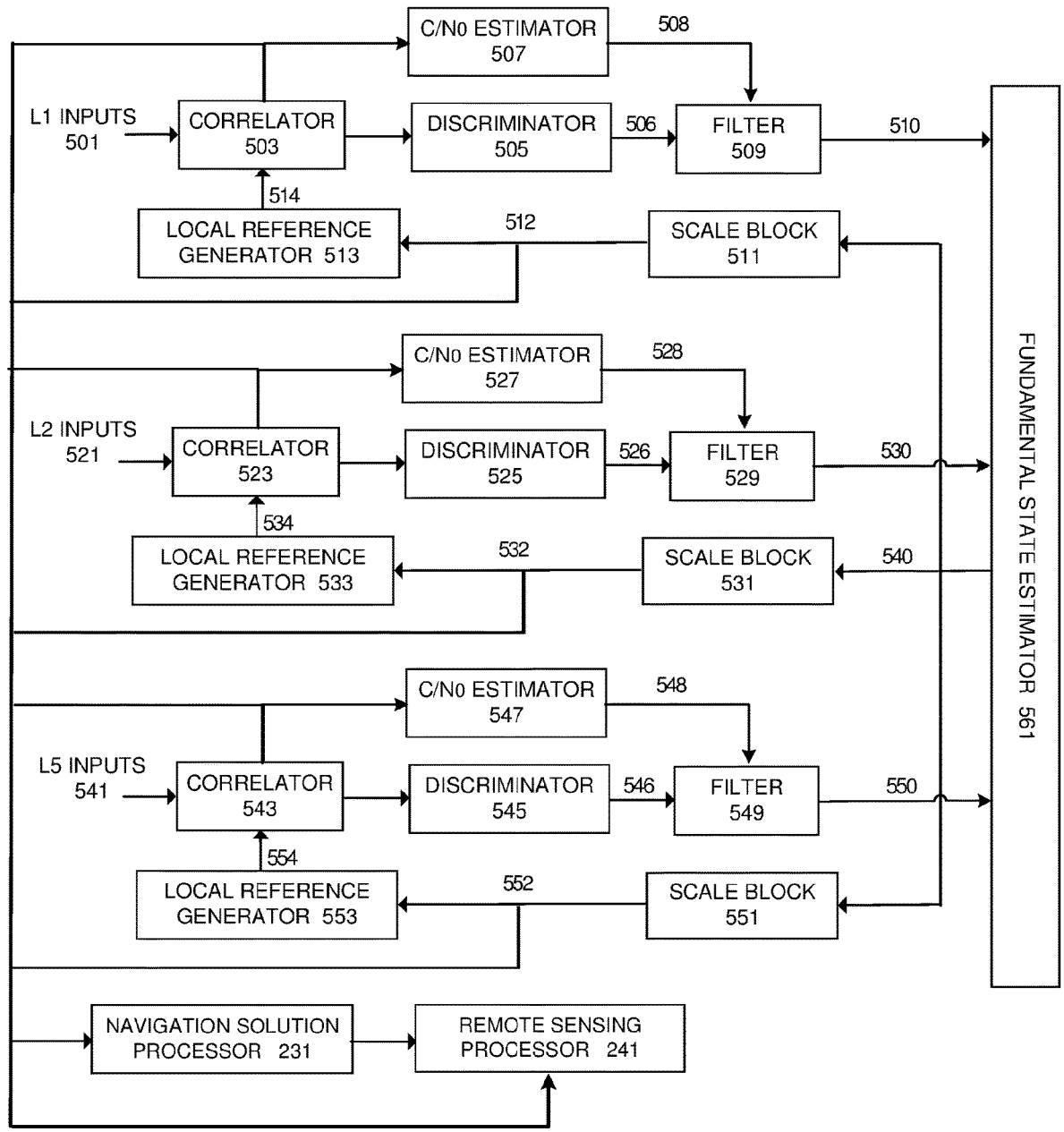
FIG. 5 illustrates a block diagram of a JT mode in accordance with some embodiments of the present technology.

JT mode shares the same signal correlation and generation procedures with the ST mode. The difference is that JT utilizes the linear combinations of multi-frequency measurements to obtain the state estimations according to the frequency dependency feature. FIG. 5 illustrates a block diagram of a JT mode in accordance with some embodiments of the present technology. L1 inputs 501, L2 inputs 521, and L5 inputs 541 represent intercepted civil signal channels L1, L2, and L5, respectively. However, embodiments of present technology are not limited to specific navigation systems and its application in various systems, including those with multiple signals at different bands, is anticipated.

In the L1 inputs 501 signal channel, correlator 503 correlates L1 inputs 501 (i.e., which were collected from the receiver front end 211) with the local code sequences and carrier sequences, which are represented by signal 514, via the integration accumulation operations. The local reference generator 513 for code tracking loop 225 and carrier tracking loop 227 can include a separate code signal generator and a carrier signal generator. In some embodiments, the code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 503 outputs six correlation results, EI, EQ, PI, PQ, LI, and LQ. These results may be used in navigation solution processor 231 (e.g., PI) for navigation message decoding if the signal is modulated with navigation data, or in signal $C/N_0$ estimator 507 (e.g., PI and PQ) to obtain L1 signal strength estimations 508, or in code and phase discriminators located in discriminator 505 to obtain interval average estimation error 506 between L1 inputs 501 and signal 514. For instance, in code tracking loop 225 the code discriminator aspect of discriminator 505 utilizes EI, EQ, LI, and LQ to obtain the average code delay error measurements, and in carrier tracking loop 227 the phase discriminator aspect of discriminator 505 utilizes PI and PQ to calculate the average phase error measurements.

Filter 509 can be used to calculate the filter gain in order to eliminate the noise effects in discriminator output estimation error 506. The second order and third order low pass filters are typically used for the static and dynamic applications. Filter 509 can be implemented in various designs, such as, the proportional integral filter (PIF), the Wiener filter (WF), and the Kalman filter(KF). Taking the KF design for example, filter gains are controlled by the signal qualities, such as signal $C/N_0$ estimations 508 from signal $C/N_0$ estimator 507 output.

In the L2 inputs 521 signal channel, correlator 523 correlates L2 inputs 521 (i.e., which were collected from the receiver front end 211) with the local code sequences and carrier sequences, which are represented by signal 534, via the integration accumulation operations. The local reference generator 533 for code tracking loop 225 and carrier tracking loop 227 can include a separate code signal generator and a carrier signal generator. The code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 523 outputs six correlation results, EI, EQ, PI, PQ, LI, and LQ. These results may be used in navigation solution processor 231 (e.g., PI) for navigation message decoding if the signal is modulated with navigation data, or in signal $C/N_0$ estimator 527 (e.g., PI and PQ) to obtain L2 signal strength estimations 528, or in code and phase discriminators located in discriminator 525 to obtain interval average estimation error 526 between L2 inputs 521 and signal 534. For instance, in code tracking loop 225 the code discriminator aspect of discriminator 525 utilizes EI, EQ, LI, and LQ to obtain the average code delay error measurements, and in carrier tracking loop 227 the phase discriminator aspect of discriminator 525 utilizes PI and PQ to calculate the average phase error measurements.

Filter 529 can be used to calculate the filter gain in order to eliminate the noise effects in discriminator output estimation error 526. The second order and third order low pass filters are typically used for the static and dynamic applications. Filter 529 can be implemented in various designs, such as, the proportional integral filter, the Wiener filter, and the Kalman filter. Taking the KF design for example, filter gains are controlled by the signal qualities, such as signal $C/N_0$ estimations 528 from signal $C/N_0$ estimator 527 output.

In the L5 inputs 541 signal channel, correlator 543 correlates L5 inputs 541 (i.e., which were collected from the receiver front end 211) with the local code sequences and carrier sequences, which are represented by signal 554, via the integration accumulation operations. The local reference generator 553 for code tracking loop 225 and carrier tracking loop 227 can include a separate code signal generator and a carrier signal generator. The code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 543 outputs six correlation results, EI, EQ, PI, PQ, LI, and LQ. These results may be used in navigation solution processor 231 (e.g., PI) for navigation message decoding if the signal is modulated with navigation data, or in signal $C/N_0$ estimator 547 (e.g., PI and PQ) to obtain L5 signal strength estimations 548, or in code and phase discriminators located in discriminator 545 to obtain interval average estimation error 546 between L5 inputs 541 and signal 554. For instance, in code tracking loop 225 the code discriminator aspect of discriminator 545 utilizes EI, EQ, LI, and LQ to obtain the average code delay error measurements, and in carrier tracking loop 227 the phase discriminator aspect of discriminator 545 utilizes PI and PQ to calculate the average phase error measurements.

Filter 549 can be used to calculate the filter gain in order to eliminate the noise effects in discriminator output estimation error 546. The second order and third order low pass filters are typically used for the static and dynamic applications. Filter 549 can be implemented in various designs, such as, the proportional integral filter, the Wiener filter, and the Kalman filter. Taking the KF design for example, filter gains are controlled by the signal qualities, such as signal $C/N_0$ estimations 548 from signal $C/N_0$ estimator 547 output.

An estimation of the common state among the multi-frequency signal channels is obtained using filter output 510, filter output 530, and filter output 550 in a fundamental state estimator 561. JT mode produces the novel state estimation 512 by scaling fundamental state estimation 540 with a frequency ratio at scale block 511, the novel state estimation 532 by scaling fundamental state estimation 540 with a frequency ratio at scale block 531, and the novel state estimation 552 by scaling fundamental state estimation 540 with a frequency ratio at scale block 551. Then, novel state estimation 512 is fed back to local reference generator 513, novel state estimation 532 is fed back to local reference generator 533, and novel state estimation 552 is fed back to local reference generator 553 in preparation for correlation in correlator 503, correlator 523, and correlator 543, respectively, during the next epoch.

OT Mode

Figure 6:
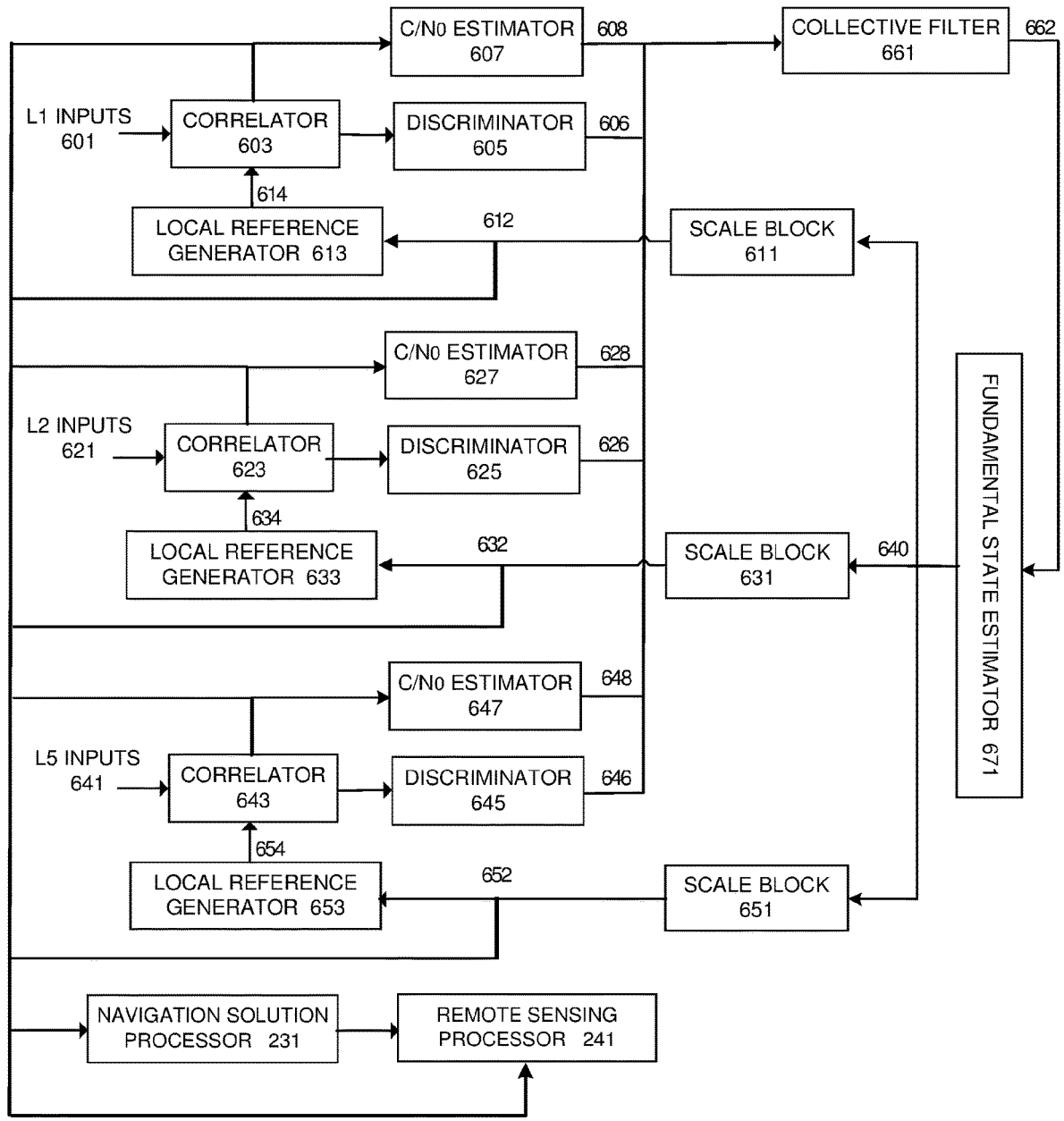
FIG. 6 illustrates a block diagram of an OT mode in accordance with some embodiments of the present technology.

The OT mode is an extension of the JT mode with consideration of signal intensity in optimization. The multi-frequency measurements are combined in an optimal manner to obtain fundamental state estimation as well as individual state estimation. FIG. 6 illustrates a block diagram of an OT mode in accordance with some embodiments of the present technology. L1 inputs 601, L2 inputs 621, and L5 inputs 641 represent intercepted civil signal channels L1, L2, and L5, respectively. However, embodiments of present technology are not limited to specific navigation systems and its application in various systems, including those with multiple signals at different bands, is anticipated.

In the L1 inputs 601 signal channel, correlator 603 correlates L1 inputs 601 (e.g., which were collected from the receiver front end 211) with the local code sequences and carrier sequences, which are represented by signal 614, via the integration accumulation operations. The local reference generator 613 for code tracking loop 225 and carrier tracking loop 227 can include a separate code signal generator and a carrier signal generator. In some embodiments, the code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 603 outputs six correlation results, EI, EQ, PI, PQ, LI, and LQ. These results may be used in navigation solution processor 231 (e.g., PI) for navigation message decoding if the signal is modulated with navigation data, or in signal $C/N_0$ estimator 607 (e.g., PI and PQ) to obtain L1 signal strength estimations 608, or in code and phase discriminators located in discriminator 605 to obtain interval average estimation error 606 between L1 inputs 601 and signal 614. For instance, in code tracking loop 225 the code discriminator aspect of discriminator 605 utilizes EI, EQ, LI, and LQ to obtain the average code delay error measurements, and in carrier tracking loop 227 the phase discriminator aspect of discriminator 605 utilizes PI and PQ to calculate the average phase error measurements.

In the L2 inputs 621 signal channel, correlator 623 correlates L2 inputs 621 (i.e., which were collected from the receiver front end 211) with the local code sequences and carrier sequences, which are represented by signal 634, via the integration accumulation operations. The local reference generator 633 for code tracking loop 225 and carrier tracking loop 227 can include a separate code signal generator and a carrier signal generator. The code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 623 outputs six correlation results, EI, EQ, PI, PQ, LI, and LQ. These results may be used in navigation solution processor 231 (e.g., PI) for navigation message decoding if the signal is modulated with navigation data, or in signal $C/N_0$ estimator 627 (e.g., PI and PQ) to obtain L2 signal strength estimations 628, or in code and phase discriminators located in discriminator 625 to obtain interval average estimation error 626 between L2 inputs 621 and signal 634. For instance, in code tracking loop 225 the code discriminator aspect of discriminator 625 utilizes EI, EQ, LI, and LQ to obtain the average code delay error measurements, and in carrier tracking loop 227 the phase discriminator aspect of discriminator 625 utilizes PI and PQ to calculate the average phase error measurements.

In the L5 inputs 641 signal channel, correlator 643 correlates L5 inputs 641 (e.g., which were collected from the receiver front end 211) with the local code sequences and carrier sequences, which are represented by signal 654, via the integration accumulation operations. The local reference generator 653 for code tracking loop 225 and carrier tracking loop 227 can include a separate code signal generator and a carrier signal generator. The code signal generator in code tracking loop 225 can generate three local PRN code sequences, early (E), prompt (P), and late (L) that are advanced against (e.g., one half chip), aligned with, and time delayed behind (e.g., one half chip) the current code state estimations, respectively.

The carrier signal generator in carrier tracking loop 227 can generate the in-phase (I) or quadrature (Q) phase carriers that are phase coincidence with or orthogonal to the current carrier state estimations. Therefore, correlator 643 outputs six correlation results, EI, EQ, PI, PQ, LI, and LQ. These results may be used in navigation solution processor 231 (e.g., PI) for navigation message decoding if the signal is modulated with navigation data, or in signal C/N$_0$ estimator 647 (e.g., PI and PQ) to obtain L5 signal strength estimations 648, or in code and phase discriminators located in discriminator 645 to obtain interval average estimation error 646 between L5 inputs 641 and signal 654. For instance, in code tracking loop 225 the code discriminator aspect of discriminator 645 utilizes EI, EQ, LI, and LQ to obtain the average code delay error measurements, and in carrier tracking loop 227 the phase discriminator aspect of discriminator 645 utilizes PI and PQ to calculate the average phase error measurements.

Collective filter 661 can be used to integrate the estimations errors on L1 606, L2 626, and L5 646 with each respective weight to eliminate the noise effects. Collective filter 661 can be implemented in various designs, such as, the proportional integral filter (PIF), the Kalman filter (KF) and the sigma-rho filter. Taking the KF design for example, filter gains or weights are controlled by the signal qualities, such as signal C/No estimations on L1 608, L2 628, and L5 648 for optimization. To decrease computational complexity, different values of L1, L2, and L5 C/No can be pre-defined and the corresponding KF gains can be pre-calculated and stored in a look-up table.

Collective filter outputs 662 are then be used in fundamental state estimator 671 to obtain fundamental carrier state estimations. Based on fundamental state estimations 640, OT mode produces the novel state estimation 612 by scaling with frequency ratio in L1 scale block 611, the novel state estimation 632 by scaling with frequency ratio in L2 scale block 631, and the novel state estimation 652 by scaling with frequency ratio in L5 scale block 651. Then, novel state estimation 612 is fed back to local reference generator 613, novel state estimation 632 is fed back to local reference generator 633, and novel state estimation 652 is fed back to local reference generator 653 in preparation for correlation in correlator 603, correlator 623, and correlator 643, respectively, during the next epoch.

Navigation solution processor 231 may use the correlation results (e.g. I) on L1 603, L2 623, and L5 643 and the carrier state estimations on L1 612, L2 632, and L5 652 for navigation message decoding and receiver positioning. Receiver navigation solutions together with correlation results on L1 603, L2 623, and L5 643 or the carrier state estimations on L1 612, L2 632, and L5 652 can be used in remote sensing processor 241 to extract and retrieve the earth surface and atmosphere information.

ST Operations

Figure 7:
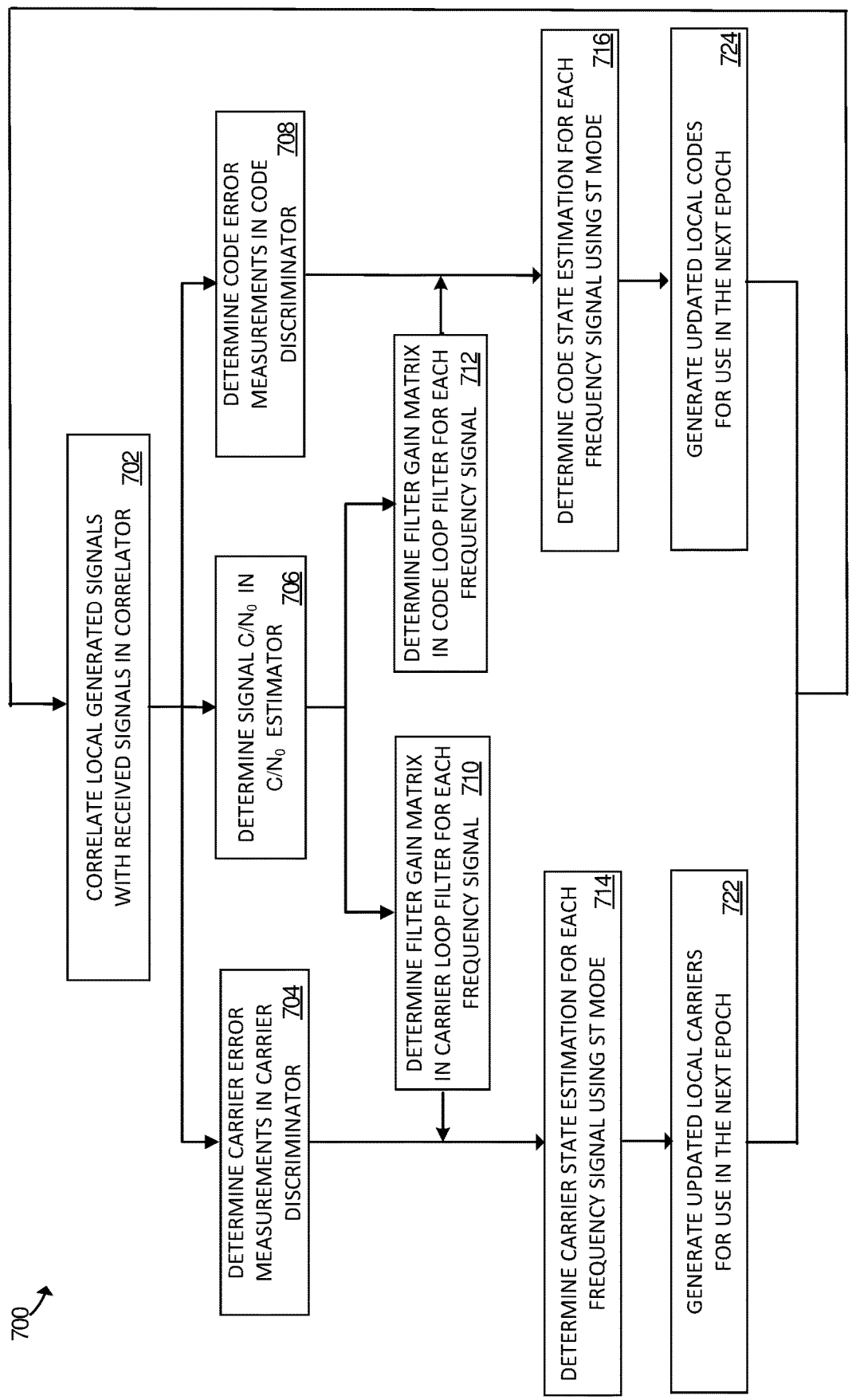
FIG. 7 is a flowchart illustrating a set of operations for applying the ST mode to carrier tracking and code tracking in accordance with some embodiments of the present technology.

FIG. 7 is a flowchart illustrating a set of operations 700 for applying the ST mode to the code tracking loop 225 and the carrier tracking loop 227, in accordance with some embodiments of the present technology. The operations illustrated in FIG. 7 can be implemented by various processors, ASICs, modules, receivers, and/or other components such as a correlator, discriminator state estimator, filters, and the like. These components may be implemented in hardware and/or software. The following description illustrates in greater detail the operations of this embodiment.

First, in step 702, the correlator correlates local generated signals and received signals. Three separate steps following step 702: the carrier discriminator determines carrier error measurements in step 704, the C/No estimator determines the signal C/No in step 706, and the code discriminator determines code error measurements in step 708. Following step 706, the carrier and code loop filters determine the filter gain matrices for each frequency signal in step 710 and 712, respectively. According to the carrier error measurements in step 704 and carrier loop filter gain matrix in step 710, a carrier state estimation is determined for each frequency signal using ST mode in step 714. Next, in step 722, updated local carriers are generated for use in the next epoch. According to the code error measurements in step 708 and code loop filter gain matrix in step 712, the code state estimation is determined for each frequency signal using ST mode in step 716. Updated local codes are subsequently generated for use in the next epoch in step 724. Each of steps 722 and 724 lead back to step 702, reinitiating the process.

Let $x_{Li,k+1} = [\varphi_i \ \omega_{di} \ \dot{\omega}_{di}]_{k+1}^T$ represent the $i^{th}$ carrier state at the $k+1^{th}$ epoch, where $i=1$, 2, and 5 for representing GPS L1C/A, L2C, and L5 signals, respectively. $\varphi_i$, $\omega_{di} = 2\pi f_{di}$, and $\dot{\omega}_{di} = 2\pi \dot{f}_{di}$ represent the carrier phase (rad), Doppler frequency (rad/s), and Doppler frequency rate (rad/s$^2$). In ST mode, the state estimator, e.g., state estimator 411, estimates the carrier state based on the previous state estimation $\hat{x}_{Li,k}$, e.g., signal 414, and the filtered measurement, e.g., output 410:

$$\hat{x}_{Li,k+1} = A\hat{x}_{Li,k} + AL_{Li,k}\Delta\theta_{Li,k}$$

where A is the transition matrix and has the following form:

$$A = \begin{bmatrix} 1 & T & \frac{T^2}{2} \\ 0 & 1 & T \\ 0 & 0 & 1 \end{bmatrix}.$$

$\Delta\theta_{Li,\ k}$ is the phase error measurement, e.g., estimation error 406, obtained from the phase discriminator, e.g., discriminator 405. $L_{Li,k}$ is a 3×1 dimensional gain matrix obtained from carrier tracking loop filter, e.g., filter 409. With KF implementation, $L_{Li,k}$ is controlled by the signal C/No estimator, e.g., C/No estimator 407. The filter output, e.g., output 410, has the form of $L_{Li,k}\Delta\theta_{Li,\ k}$, representing the filtered measurement being used in the state estimator.

Let $x_{Ci,k+1} = [\tau \ \dot{\tau}_d \ \ddot{\tau}_d]_{i,k+1}^T$ represent the $i^{th}$ code state for each code sequence at the $k+1^{th}$ epoch, where $\tau_{i,k+1}$, $\dot{\tau}_{di,k+1}$, and $\ddot{\tau}_{di,k}+1$ are the code delay (chip or sample), code Doppler frequency (Hz), and code Doppler frequency rate (Hz/s), respectively. In the ST mode, the state estimator, e.g., state estimator 411, estimates the code state based on the previous state estimation $\hat{x}_{Ci,k}$, e.g., signal 414, with the filtered measurements, e.g., output 410, as:

$$\hat{x}_{Ci,k+1} = A\hat{x}_{Ci,k} + AC_{Ci,k}\Delta\tau_{i,k}.$$

$\Delta\tau_{i,k}$ is the code delay error measurement, e.g., estimation error 406, obtained from the code discriminator, e.g., discriminator 405. $C_{Ci,k}$ is a 3×1 dimensional gain matrix obtained from code tracking loop filter, e.g., filter 409. With KF implementation, $C_{Li,k}$ is controlled by the signal C/No estimator, e.g., C/No estimator 407. The filter output, e.g., output 410, has the form of $C_{Ci,k}\Delta\tau_{i,k}$, representing the filtered measurement being used in the state estimator.

JT Operations

Figure 8:
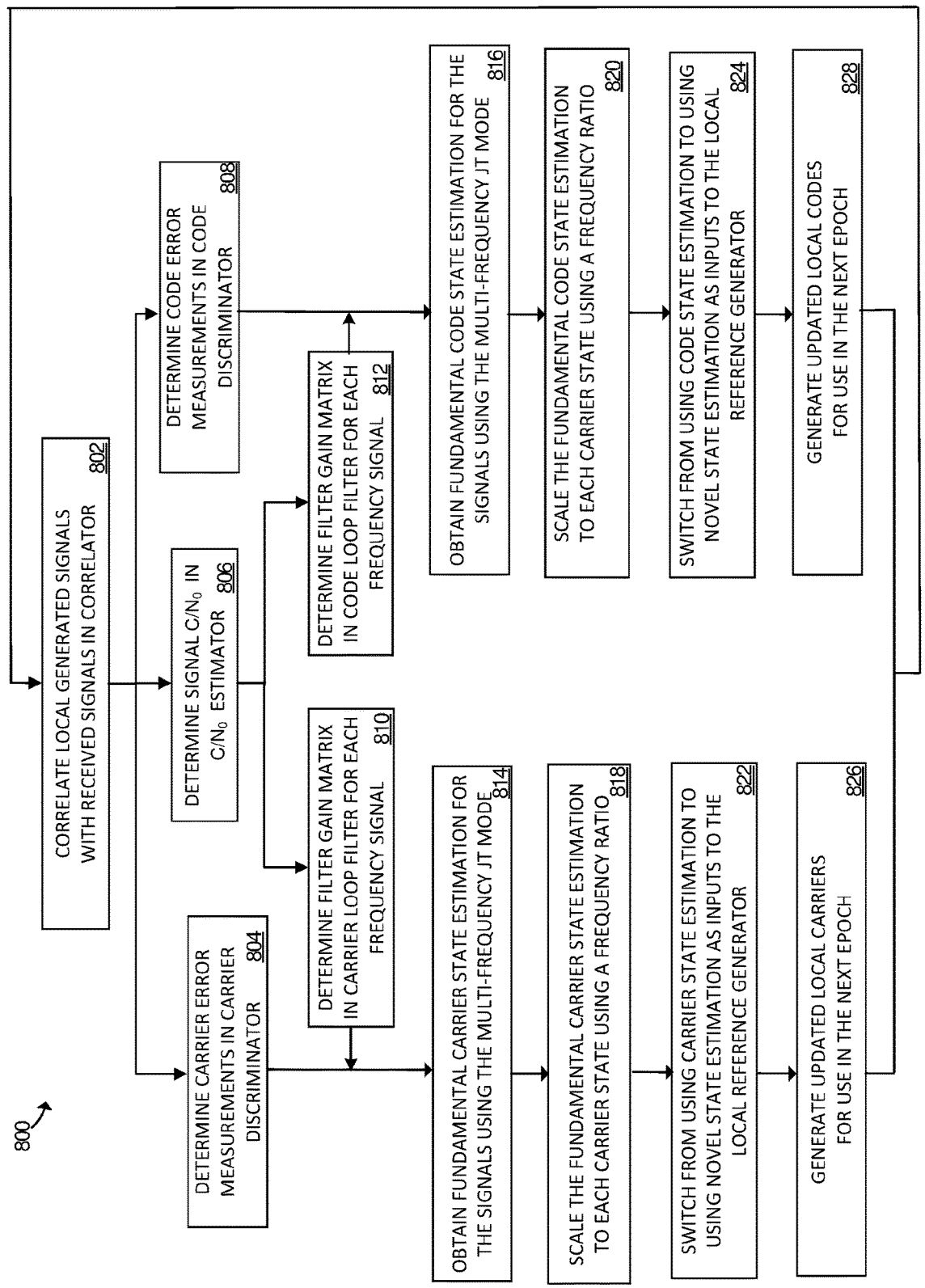
FIG. 8 is a flowchart illustrating a set of operations for applying the JT mode to carrier tracking and code tracking in accordance with some embodiments of the present technology.

FIG. 8 is a flowchart illustrating a set of operations 800 for applying the JT mode to the code tracking loop 225 and the carrier tracking loop 227 in accordance with some embodiments of the present technology. The operations illustrated in FIG. 8 can be implemented by various processors, ASICs, modules, receivers, and/or other components such as a correlator, discriminator state estimator, filters, and the like. These components may be implemented in hardware and/or software. The following description illustrates in greater detail the operations of this embodiment.

Set of operations 800 begins with step 802, where the correlator correlates local generated signals with received signals. Each of three steps follow step 802: step 804, determining the carrier error measurements in the carrier discriminator, step 806, determining signal C/No in C/No estimator, and step 808, determining code error measurements in code discriminator. Step 806 is subsequently followed by each of two steps: steps 810 and 812, determining the filter gain matrices in the carrier and code loop filters for each frequency signal.

Steps 804 and 810 are both followed by step 814, obtaining the fundamental carrier state estimation for the signals using the multi-frequency JT mode. Next, in step 818, the fundamental state estimation to each carrier state is scaled using a frequency ratio. Next, step 822 comprises switching from using the carrier state estimation to using the novel state estimation as inputs to the local reference generator. Finally, updated local carriers are generated for use in the next epoch in step 826. The process returns to step 802 after step 826.s Step 816 follows both of steps 812 and 808. Step 816 comprises obtaining the fundamental code state estimation for the signals using the multi-frequency JT mode. Step 820 follows step 816 and comprises scaling the fundamental code state estimation to each carrier state using a frequency ratio. Next, in step 824, using code states estimation switches to using novel state estimation as inputs to the local reference generator. Finally, in step 828, updated local codes are generated for use in the next epoch. The process returns to step 802 after step 828.

For exemplary purposes, it is assumed that the L1, L2, and L5 carrier signals are transmitted from the same satellite by multiplying the fundamental carrier ($f_0$=10.23 MHz) with the factors $\eta_1$=154, $\eta_2$=120, and $\eta_5$=115, respectively. In addition, it is assumed that these hard carriers are received by the same receiver, they share the same propagation distance $\rho$, velocity $v$, and acceleration $a$ due to the relative LOS satellite-receiver motion. As a result, each carrier frequency in this embodiment is proportional to the fundamental carrier frequency as:

$$f_{Li} = \eta_i f_0,$$

given that the fundamental signal has the carrier state $y_{k+1} = [\varphi_0 \; \omega_{d0} \; \dot{\omega}_{d0}]_{k+1}^T$ at k+1$^{th}$ epoch. Similarly, each carrier phase $\omega_i$, Doppler frequency $\omega_{di}$, and Doppler frequency rate $\dot{\omega}_{di}$ are also proportional to the fundamental carrier state:

$$x_{Li,k+1} = \eta_i y_{k+1}.$$

Given the phase error measurement $\Delta\theta_{Li,k}$, e.g., estimation errors 506, 526, and 546, obtained from the phase discriminator, e.g., discriminator 505, 525, and 545 and the gain matrix $L_{Li,k}$ obtained from carrier tracking loop filter, e.g., filter 509, 529, and 549 and controlled by the signal C/No estimator, e.g., C/No estimator 507, 527, and 547, the joint carrier innovation in the JT mode can be obtained as:

$$\Delta\bar{\theta}_{k+1} = \frac{\eta_1 L_{L1,k}\Delta\theta_{L1,k} + \eta_2 L_{L2,k}\Delta\theta_{L2,k} + \eta_5 L_{L5,k}\Delta\theta_{L5,k}}{\eta_1^2 + \eta_2^2 + \eta_5^2}.$$

Then the fundamental state estimation, e.g., state estimation 540, $\bar{y}_{k+1}$ in fundamental state estimator, e.g., 561 can be obtained as:

$$\bar{y}_{k+1} = A\bar{y}_k + A\Delta\bar{\theta}_{k+1}.$$

Scaling the fundamental carrier state estimator output $\bar{y}_{k+1}$, e.g., fundamental state estimation 540, with $\eta_1$, $\eta_2$, and $\eta_5$ in the scale block, e.g., 511, 531, and 551, provides the novel carrier state estimation in JT mode, e.g., novel state estimation 512, 532, and 552, $\bar{x}_{Li,k+1}$ which can be obtained as:

$$\bar{x}_{Li,k+1} = \eta_i \bar{y}_{k+1}.$$

The local reference generator for carrier tracking loop 227 can use either ST mode estimation $\hat{x}_{Li,k+1}$, e.g., state estimation 412, 432, and 452, or JT mode estimation $\bar{x}_{Li,k+1}$, e.g., novel state estimation 512, 532, and 552, to generate I and Q carrier signals.

For exemplary purposes, it is assumed that the L1C/A, L2C, and L5 signals are broadcasted by the same satellite with code rates of $f_{C1}$=1.023 MHz, $f_{C2}$=1.023 MHz, and $f_{C5}$=10.23 MHz, respectively. The fundamental code signal is chosen to have the basis frequency with $f_{C0}$=1.23 MHz. Therefore, each code frequency is proportional to the fundamental code signal as:

$$f_{Ci} = \gamma_i f_{C0}$$

where i=1, 2, and 5 for the L1C/A, L2C, and L5 signals, and the factors for the code tracking loop 225 respectively are $\gamma_1$=1, $\gamma_2$=1, and $\gamma_5$=10.

Again, let $y_{C,k+1} = [\tau_0 \; \dot{\tau}_{d0} \; \ddot{\tau}_{d0}]_{k+1}^T$ represent the fundamental code state. Given the code error measurement $\Delta\tau_{i,k}$, e.g., estimation error 506, 526, and 546 obtained from the code discriminator, e.g., discriminator 505, 525, and 545 and the gain matrix $C_{Ci,k}$ obtained from code tracking loop filter, e.g., filter 509, 529, and 549 and controlled by the signal C/No estimator, e.g., C/No estimator 507, 527, and 547. The joint code innovation in the JT mode can be obtained as:

$$\Delta\bar{\tau}_{k+1} = \frac{\gamma_1 C_{C1,k}\Delta\tau_{1,k} + \gamma_2 C_{C2,k}\Delta\tau_{2,k} + \gamma_5 C_{C5,k}\Delta\tau_{5,k}}{\gamma_1^2 + \gamma_2^2 + \gamma_5^2}.$$

Then the fundamental state estimation e.g., state estimation 540, $\bar{y}_{C,k+1}$ in fundamental state estimator, e.g., 561, can be obtained as:

$$\bar{y}_{C,k+1} = A\bar{y}_{C,k} + A\Delta\bar{\tau}_{k+1}.$$

Scaling the fundamental code state estimator output $\bar{y}_{C,k+1}$, e.g., fundamental state estimation 540, with $\gamma_1$, $\gamma_2$, and $\gamma_5$ in the scale block, e.g., 511, 531, and 551, provides the novel code state estimation in JT mode, e.g., novel state estimation 512, 532, and 552, $\bar{x}_{Ci,k+1}$ and can be obtained as:

$$\bar{x}_{Ci,k+1} = \gamma_i \bar{y}_{C,k+1}.$$

The local reference generator for code tracking loop 225 can use either ST mode estimation $\hat{x}_{Ci,k+1}$, e.g., state estimation 412, 432, and 452, or JT mode estimation $\bar{x}_{Ci,k+1}$, e.g., novel state estimation 512, 532, and 552 to generate the local E, P, L code sequences.

OT Operations

Figure 9:
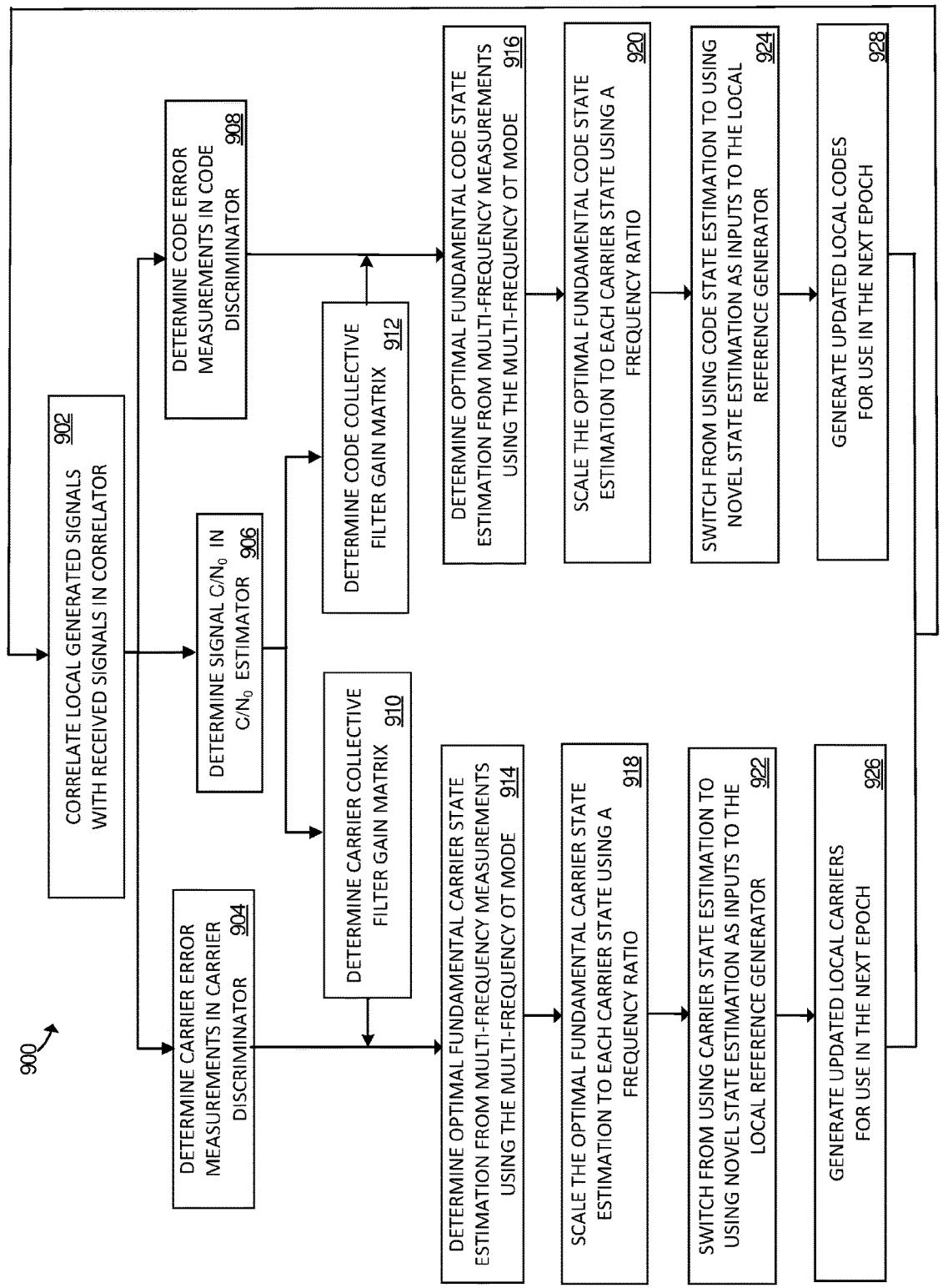
FIG. 9 is a flowchart illustrating a set of operations for applying the OT mode to carrier tracking and code tracking in accordance with some embodiments of the present technology.

FIG. 9 is a flowchart illustrating a set of operations 900 for applying the OT mode to the code tracking loop 225 and the carrier tracking loop 227 in accordance with some embodiments of the present technology. The operations illustrated in FIG. 9 can be implemented by various processors, ASICs, modules, receivers, and/or other components such as a correlator, discriminator state estimator, filters, and the like. These components may be implemented in hardware and/or software. The following description illustrates in greater detail the operations of this embodiment.

Set of operations 900 begins with step 902, where the correlator correlates local generated signals with received signals. Each of the following three steps follow step 902: step 904, determining the carrier error measurements in the carrier discriminator, step 906, determining signal C/No in C/No estimator, and step 908, determining code error measurements in the code discriminator. Step 906 is subsequently followed by each of two steps: steps 910 and 912, determining the collective filter gain matrix for carrier tracking and code tracking, respectively.

Steps 904 and 910 are both followed by step 914, determining the optimal fundamental carrier state estimation from multi-frequency measurements using the multi-frequency OT mode. Next, in step 918, the optimal fundamental carrier state estimation to each carrier state is scaled using a frequency ratio. Next, step 922 comprises switching from using the carrier state estimation to using the novel state estimation as inputs to the local reference generator. Finally, updated local carriers are generated for use in the next epoch in step 926. The process returns to step 902 after step 926.

Step 916 follows both of steps 912 and 908. Step 916 comprises determining the optimal fundamental code state estimation from multi-frequency measurements using the multi-frequency OT mode. Step 920 follows step 916 and comprises scaling the fundamental code state estimation to each carrier state using a frequency ratio. Next, step 924 comprises switching from using code state estimation to using novel state estimation as inputs to the local reference generator. Finally, in step 928, updated local codes are generated for use in the next epoch. The process returns to step 902 after step 928.

Given the phase error measurement $\Delta\theta_{Li,k}$, e.g., estimation error 606, 626, and 646 obtained from the phase discriminator, e.g., discriminator 605, 625, and 645 as the input to the collective filter 661, the fundamental state estimation e.g., state estimation 640, $\tilde{y}_{k+1}$ in fundamental state estimator, e.g., 671, can be obtained as:

$$\tilde{y}_{k+1} = A\tilde{y}_k + AK_k z_{k+1}$$

where $z_{k+1}$ is the multi-carrier measurement input vector with $z_{k+1} = [\Delta\theta_{L1,k}\ \Delta\theta_{L2,k}\ \Delta\theta_{L5,k}]$. $K_k$ is a 3×3 dimensional gain matrix obtained from carrier tracking loop filter, e.g., collective filter 661. With KF implementation, $K_k$ is controlled by the signal C/No estimator, e.g., C/No estimator 607, 628, and 648 in all the tracking channels. The collective filter output, e.g., output 662, has the form of $K_k z_{k+1}$, representing the filtered carrier innovation in OT mode, being used in the fundamental state estimator 671.

Scaling the fundamental carrier state estimator output $\tilde{y}_{k+1}$, e.g., fundamental state estimation 640, with $\eta_1$, $\eta_2$, and $\eta_5$ in the scale block, e.g., 611, 631, and 651, provides the novel carrier state estimation in OT mode, e.g., novel state estimation 612, 632, and 652, $\bar{x}_{Li,k+1}$, and can be obtained as:

$$\tilde{x}_{Li,k+1} = \eta_i \tilde{y}_{k+1}.$$

The local reference generator for carrier tracking loop 227 can use either ST mode estimation $\hat{x}_{Li,k+1}$, e.g., state estimation 412, 432, and 452, or OT mode estimation $\tilde{x}_{Li,k+1}$, e.g., novel state estimation 612, 632, and 652, to generate I and Q carrier signals.

Again, given the code error measurement $\Delta\tau_{i,k}$, e.g., estimation error 606, 626, and 646 obtained from the code discriminator, e.g., discriminator 605, 625, and 645 as the input to the collective filter 661, the fundamental state estimation e.g., state estimation 640, $\tilde{y}_{C,k+1}$ in fundamental state estimator, e.g., 671, can be obtained as:

$$\tilde{y}_{C,k+1} = A\tilde{y}_{C,k} + AG_k b_{k+1}$$

where $b_{k+1}$ is the multi-frequency code measurement input vector with $b_{k+1} = [\Delta\tau_{1,k}\ \Delta\tau_{2,k}\ \Delta\tau_{5,k}]$. $G_k$ is a 3×3 dimensional gain matrix obtained from code tracking loop filter, e.g., collective filter 661. With KF implementation, $G_k$ is controlled by the signal C/No estimator, e.g., C/No estimator 607, 628, and 648 in all the tracking channels. The collective filter output, e.g., output 662, has the form of $G_k b_{k+1}$, representing the filtered code innovation in OT mode, being used in the fundamental state estimator 671.

Scaling the fundamental code state estimator output fundamental state estimation 640, with $\gamma_1$, $\gamma_2$, and $\gamma_5$ in the scale block, e.g., 611, 631, 651, provides the novel code state estimation in OT mode, e.g., novel state estimation 612, 632, and 652, $\tilde{x}_{Ci,k+1}$ and can be obtained as:

$$\tilde{y}_{Ci,k+1} = \gamma_i \tilde{y}_{C,k+1}.$$

The local reference generator for code tracking loop 225 can use either ST mode estimation $\hat{x}_{Ci,k+1}$, e.g., state estimation 412, 432, and 452, or OT mode estimation $\tilde{x}_{Ci,k+1}$, e.g., novel state estimation 612, 632, and 652 to generate the local E, P, and L code sequences.

Switching Between ST and JT

Neither pure ST mode, pure JT mode nor pure OT mode are ideal operations for the multi-frequency code or carrier signal tracking. For instance, when the signal experiences deep fading or fast fluctuations in a challenging environment, the state estimation and feedback mechanism in ST mode becomes ineffective. With the inter-frequency aiding strategy, JT mode can produce better state estimations than that of ST mode to assist the fading signal channel tracking. However, if all of the signal channels operate in JT mode, then the strong signal tracking performance may be degraded by the bad estimations from the fading signals. OT can address the weak signal degradation issues existing in the JT mode by incorporating signal quality into multi-frequency combinations in an optimal manner. OT performs better in recovering the tracking parameters in fading channels. However, as all the channels are combined in the OT, the state estimations will become biased over time due to the divergence caused by the environmental effects. An alternate approach used in some embodiments is to adaptively switching between ST and JT, or switching between ST and OT, in each signal channel can solve the related issues.

Figure 10:
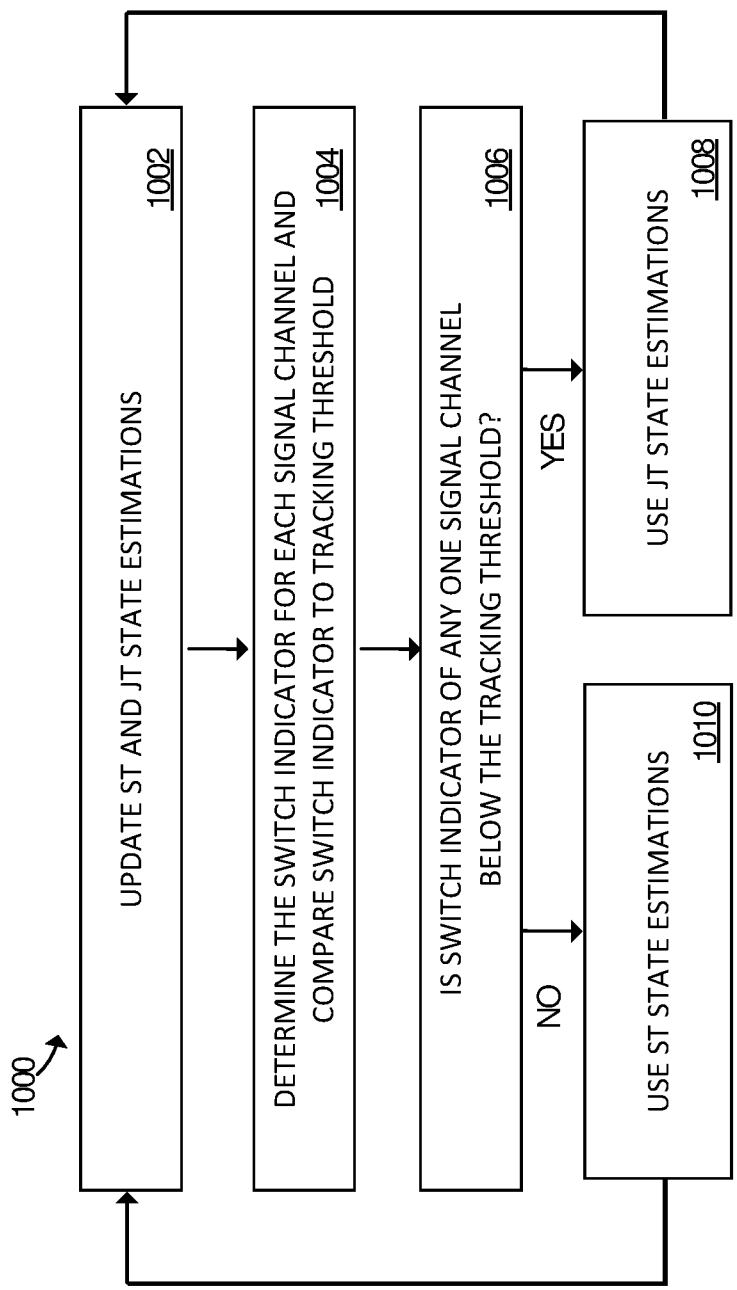
FIG. 10 is a flowchart illustrating a set of operations for switching between a single frequency ST mode and a multi-frequency JT mode in accordance with some embodiments of the present technology.

FIG. 10 is a flowchart illustrating a set of operations 1000 for switching between a single frequency tracking mode and a multi-frequency joint tracking mode in accordance with some embodiments of the present technology. In the embodiments illustrated in FIG. 10, update operation 1002 can update both the ST and JT state estimations. Determination operation 1004 can determine the switch indicator for each signal channel and compare the switch indicator to a tracking threshold. In accordance with various embodiments, the switch indicator can be selected as some parameters (e.g., single parameter, two or more parameters, synthetic combination of parameters, etc.) that have the real reflections on the actual signal changes, such as the signal-to-noise ratios that relate to the signal power variations or the phase lock indicators that relate to the signal phase fluctuations. The switch indicators for the code tracking loop 225 and carrier tracking loop 227 under different application scenarios are to be considered case by case.

Selection operation 1006 determines whether the switch indicator of any channel is below the tracking threshold. If yes, the program executes operation 1008 and selects JT state estimations. Otherwise, the operation 1010 will be performed and the ST state estimations will be selected accordingly.

More specifically, selection operation 1006 can be conducted in this way: for each time interval, both the ST state estimations, e.g., state estimation 412, and JT state estimations, e.g., novel state estimation 512, will be updated in each signal channel.

If the switch indicator from a particular channel decreases below the tracking threshold where the signal can be barely independently tracked and locked, the aiding behavior for the degraded signal channel, e.g., L1 inputs 501 signal channel, is required. In this case, the local reference generator in the degraded signal channel takes the JT mode estimations, e.g., novel state estimation 512, as the input for the local reference generator 513. The other uncompromised channels, e.g., L2 inputs 521 and L5 inputs 541 signal channels, keep using the ST estimations as inputs, e.g., input signal 432, 452 as the state estimation. Once the switch indicator in the degraded channel recovers above the tracking threshold, the tracking loop can be switched back to the ST mode and use the ST state estimations as the input signals to the local reference generator. Using this switching strategy, both the strong signal and weak signal tracking performance can be guaranteed.

Switching Between ST and OT

Figure 11:
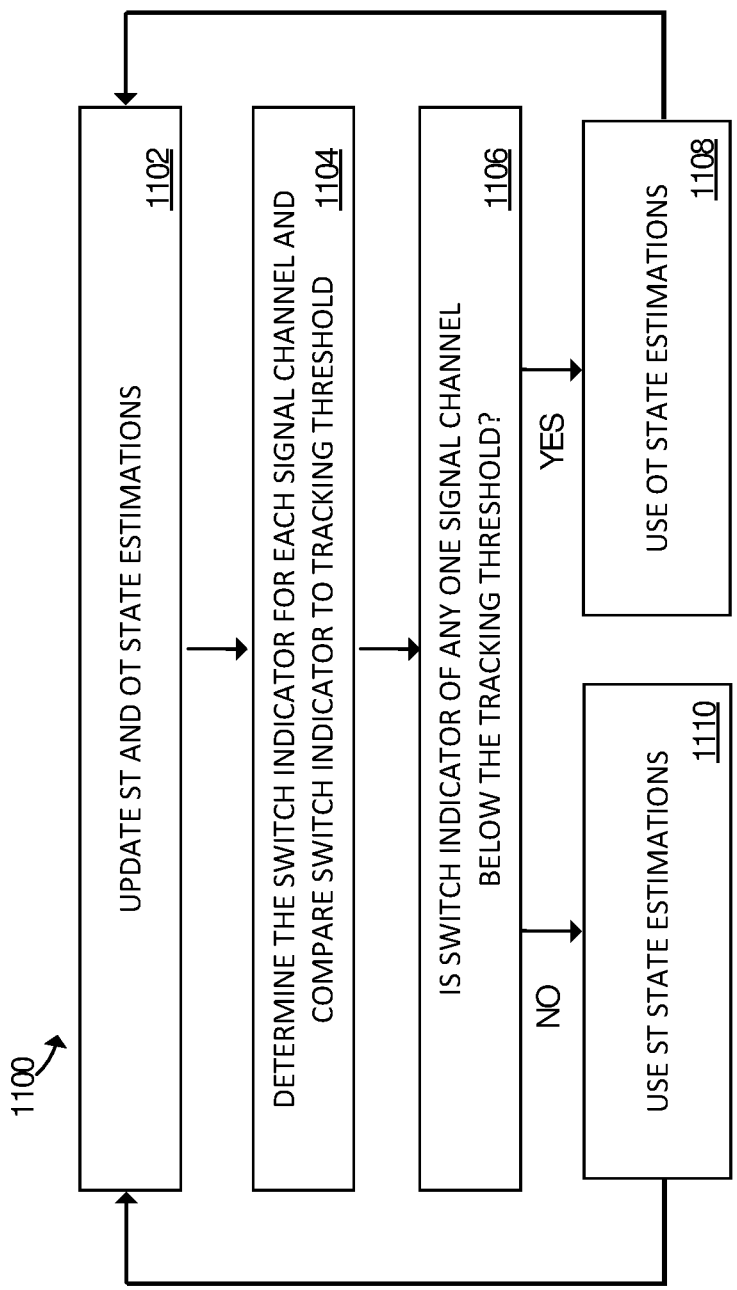
FIG. 11 is a flowchart illustrating a set of operations for switching between a single frequency ST mode and a multi-frequency OT mode in accordance with some embodiments of the present technology.

FIG. 11 is a flowchart illustrating a set of operations 1100 for switching between a single frequency tracking mode and a multi-frequency optimal tracking mode in accordance with some embodiments of the present technology. In the embodiments illustrated in FIG. 11, update operation 1102 can update both the ST and OT state estimations. Determination operation 1104 can determine the switch indicator for each signal channel and compare the switch indicator to a tracking threshold. In accordance with various embodiments, the switch indicator can be selected as some parameters (e.g., single parameter, two or more parameters, synthetic combination of parameters, etc.) that have the real reflections on the actual signal changes, such as the signal-to-noise ratios that relate to the signal power variations or the phase lock indicators that relate to the signal phase fluctuations. The switch indicators for the code tracking loop 225 and carrier tracking loop 227 under different application scenarios are to be considered case by case.

Selection operation 1106 determines whether the switch indicator of any channel is below the tracking threshold. If yes, the program executes operation 1108 and selects OT state estimations. Otherwise, the operation 1110 will be performed and the ST states estimations will be selected accordingly.

More specifically, selection operation 1106 can be conducted in this way: for each time interval, both the ST state estimations, e.g., state estimation 412, and JT state estimations, e.g., novel state estimation 612, will be updated in each signal channel.

If the switch indicator from a particular channel decreases below the tracking threshold where the signal can be barely independently tracked and locked, the aiding behavior for the degraded signal channel, e.g., L1 inputs 601 signal channel, is required. In this case, the local reference generator in the degraded signal channel takes the OT mode estimations, e.g., novel state estimation 612, as the input for the local reference generator 613. The other uncompromised channels, e.g., L2 inputs 621 and L5 inputs 641 signal channels, keep using the ST estimations as inputs, e.g., input signals 432 and 452, as the state estimation. Once the switch indicator in the degraded channel recovers above the tracking threshold, the tracking loop can be switched back to the ST mode and use the ST state estimations as the input signals to the local reference generator. Using this switching strategy, both the strong signal and weak signal tracking performance can be guaranteed.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated.

In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A multi-frequency signal receiver system comprising:
   one or more antennas configured to receive multi-frequency signals;
   a front-end configured to:
   down convert the multi-frequency signals; and
   convert the multi-frequency signals to multi-frequency digital signals;
   a baseband processing system configured to obtain parameters of the multi-frequency digital signals and implement a switching strategy;
   a navigation processor configured to provide positioning results; and
   a remote sensing processor configured to provide sounding parameters,
   wherein the switching strategy is configured to switch between use of a state estimation from a single frequency tracking (ST) mode and a fundamental state estimation from a multi-frequency joint tracking (JT) mode based at least on a switch indicator.

2. The multi-frequency signal receiver system of claim 1, wherein the switch indicator comprises at least one of a signal C/No estimator.

3. The multi-frequency signal receiver system of claim 1, wherein the switching strategy is configured to compare the switch indicator to a threshold.

4. One or more computer readable storage media having program instructions stored thereon to facilitating multi-frequency signal tracking, wherein the program instructions, when executed by a machine, direct the machine to at least:
   receive a multi-frequency signal;
   down convert the multi-frequency signal;
   convert the multi-frequency signal to a digital multi-frequency signal;
   obtain signal parameters from the multi-frequency signal; and
   implement a switching strategy,
   wherein the switching strategy is configured to switch between use of a state estimation from a ST mode and a fundamental state estimation from a multi-frequency JT mode based at least on a switch indicator.

5. The one or more computer readable storage media of claim 4, wherein the switching strategy is configured to apply to a code tracking loop and a carrier tracking loop in accordance with a tracking architecture.

6. The one or more computer readable storage media of claim 5, wherein the tracking architecture comprises a plurality of a correlator, a discriminator, a loop filter, a state estimator, a local reference generator, a fundamental state estimator, and a scale block.

7. The one or more computer readable storage media of claim 6, wherein the program instructions, in response to applying the tracking architecture to the code tracking loop, further direct the machine to:
   correlate local code signals with received signals;
   determine code state estimation errors based on the correlated signals in each channel;
   determine signal carrier-to-noise ratio based on the correlated signals in each channel;
   determine a filter gain matrix based on the signal carrier-to-noise ratios in each channel;
   obtain a code state estimation for each signal frequency using the ST mode with code state estimation errors and filter gain matrix in each channel;
   obtain a fundamental code state estimation using the multi-frequency JT mode;
   scale the fundamental code state estimation to each code state using a frequency ratio; and
   determine a code switch indicator for each signal channel.

8. The one or more computer readable storage media of claim 7, wherein the program instructions further direct the machine to:
   compare the code switch indicator to a code tracking threshold;
   determine if the code switch indicator is below the code tracking threshold; and
   switch from using code state estimations as inputs to using a novel JT state estimation when the code switch indicator is below the code tracking threshold.

9. The one or more computer readable storage media of claim 6, wherein the program instructions, in response to applying the tracking architecture to the carrier tracking loop, further direct the machine to at least:
   correlate local carrier signals with received signals;
   determine carrier state estimation errors based on the correlated signals in each channel;
   determine signal carrier-to-noise ratio based on the correlated signals in each channel;
   determine a filter gain matrix based on the signal carrier-to-noise ratios in each channel;
   obtain a carrier state estimation for each signal frequency using the ST mode with carrier state estimation errors and filter gain matrix in each channel;
   obtain a fundamental carrier state estimation using the multi-frequency JT mode;
   scale the fundamental carrier state estimation to each carrier state using a frequency ratio; and
   determine a carrier switch indicator for each signal channel.

10. The one or more computer readable storage media of claim 9, wherein the program instructions further direct the machine to:
    compare the carrier switch indicator to a carrier tracking threshold;
    determine if the carrier switch indicator is below the carrier tracking threshold; and
    switch from using carrier state estimations as inputs to using a carrier novel JT state estimation when the carrier switch indicator is below the carrier tracking threshold.

11. One or more computer readable storage media having program instructions stored thereon to facilitating multi-frequency signal tracking, wherein the program instructions, when executed by a machine, direct the machine to at least:
receive a multi-frequency signal;
down convert the multi-frequency signal;
convert the multi-frequency signal to a digital multi-frequency signal;
obtain signal parameters from the multi-frequency signal; and
implement a switching strategy,
wherein the switching strategy uses switch indicator that comprises at least one of a signal C/No estimator.

12. A multi-frequency signal receiver system comprising:
one or more antennas configured to receive multi-frequency signals;
a front-end configured to:
down convert the multi-frequency signals; and
convert the multi-frequency signals to multi-frequency digital signals;
a baseband processing system configured to obtain parameters of the multi-frequency digital signals and implement a switching strategy;
a navigation processor configured to provide positioning results; and
a remote sensing processor configured to provide sounding parameters,
wherein the switching strategy is configured to switch between use of a state estimation from a single frequency tracking (ST) mode and a fundamental state estimation from a multi-frequency optimal tracking (OT) mode based at least on a switch indicator.

13. The multi-frequency signal receiver system of claim 12, wherein the switching strategy is configured to compare the switch indicator to a threshold.

* * * * *